US012707470B2

(12) United States Patent
Takeda et al.

(10) Patent No.: US 12,707,470 B2
(45) Date of Patent: Aug. 11, 2026

(54) MULTICAST COMMUNICATION WITH CROSS-CARRIER SCHEDULING

(71) Applicant: QUALCOMM Incorporated, San Diego, CA (US)

(72) Inventors: Kazuki Takeda, Tokyo (JP); Le Liu, San Jose, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1157 days.

(21) Appl. No.: 17/719,330

(22) Filed: Apr. 12, 2022

(65) Prior Publication Data

US 2023/0328743 A1 Oct. 12, 2023

(51) Int. Cl.

| | |
|---|---|
| ***H04W 72/23*** | (2023.01) |
| ***H04W 4/06*** | (2009.01) |
| ***H04W 48/12*** | (2009.01) |
| ***H04W 72/121*** | (2023.01) |

(52) U.S. Cl.

CPC ............. *H04W 72/23* (2023.01); *H04W 4/06* (2013.01); *H04W 48/12* (2013.01); *H04W 72/121* (2013.01)

(58) Field of Classification Search

None

See application file for complete search history.

(56) References Cited

U.S. PATENT DOCUMENTS

| | | | | |
|---|---|---|---|---|
| 2017/0311322 | A1* | 10/2017 | Kim | H04W 24/10 |
| 2020/0267511 | A1* | 8/2020 | Abdoli | H04L 5/001 |
| 2021/0045147 | A1* | 2/2021 | Zhou | H04L 5/0098 |
| 2021/0274476 | A1* | 9/2021 | Yi | H04W 72/0453 |
| 2022/0061066 | A1* | 2/2022 | Zhou | H04W 76/27 |
| 2022/0304026 | A1* | 9/2022 | MolavianJazi | H04L 1/0061 |
| 2022/0322375 | A1* | 10/2022 | Huang | H04W 72/044 |
| 2022/0345853 | A1* | 10/2022 | Chen | H04W 76/40 |
| 2023/0397180 | A1* | 12/2023 | Lee | H04W 72/0457 |
| 2024/0089704 | A1* | 3/2024 | Shrivastava | H04W 72/0453 |
| 2024/0137934 | A1* | 4/2024 | Lee | H04L 1/1861 |
| 2025/0097929 | A1* | 3/2025 | Lee | H04L 5/001 |

* cited by examiner

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communication are described. A device may receive control signaling indicating a cell configuration associated with a first cell of a set of cells. The cell configuration may indicate a scheduling configuration associated with the first cell and a second cell of the set of cells for multicast communication. The device may monitor for a downlink control channel associated with the multicast communication on one or both of the first cell or the second cell based on the control signaling. The device may monitor for a downlink data channel associated with the multicast communication on one or both of the first cell or the second cell based on the monitoring of the downlink control channel. The device may receive the multicast communication on one or both of the first cell or the second cell based on the monitoring of the downlink data channel.

23 Claims, 18 Drawing Sheets

Figure 14

MULTICAST COMMUNICATION WITH CROSS-CARRIER SCHEDULING

TECHNICAL FIELD

The following relates to wireless communication, including multicast communication with cross-carrier scheduling.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or multiple base stations, each supporting wireless communication for communication devices, which may be known as user equipment (UE).

A network entity may provide communication coverage via one or more cells. In some cases, a network entity may provide the communication coverage to one or more communication devices, such as UEs, according to a carrier aggregation (CA) configuration. In examples in which the network entity provides the communication coverage via multiple cells, one cell may operate as a primary cell while another cell may operate as a secondary cell. Additionally, the network entity may support wireless communication, for example, one or both of unicast communication or multicast communication with the one or more communication devices. In some cases, these communication devices may support one or both of unicast communication or multicast communication with the network entity by supporting unicast or multicast downlink data channel reception (for example, physical downlink shared channel (PDSCH) reception), on any of the cells supported by the network entity. To support the unicast or multicast downlink data channel reception, the communication devices may be configured for unicast or multicast downlink data channel reception, or both. In some cases, these communication devices may support self-scheduling or cross-carrier scheduling to schedule resources for unicast or multicast downlink data channel reception on the secondary cell.

SUMMARY

The systems, methods, and devices of this disclosure each have several innovative aspects, no single one of which is solely responsible for the desirable attributes disclosed herein.

A method for wireless communication at a UE is described. The method may include receiving control signaling indicating a cell configuration associated with a first cell of a set of cells, the cell configuration including a scheduling configuration associated with both the first cell and a second cell of the set of cells for multicast communication, monitoring for a downlink control channel associated with the multicast communication on one or both of the first cell or the second cell based on the control signaling, monitoring for a downlink data channel associated with the multicast communication on one or both of the first cell or the second cell based on the monitoring of the downlink control channel, and receiving the multicast communication on one or both of the first cell or the second cell based on the monitoring of the downlink data channel.

An apparatus for wireless communication is described. The apparatus may include a processor, memory coupled with the processor, and instructions stored in the memory. The instructions may be executable by the processor to cause the apparatus to receive control signaling indicating a cell configuration associated with a first cell of a set of cells, the cell configuration including a scheduling configuration associated with both the first cell and a second cell of the set of cells for multicast communication, monitor for a downlink control channel associated with the multicast communication on one or both of the first cell or the second cell based on the control signaling, monitor for a downlink data channel associated with the multicast communication on one or both of the first cell or the second cell based on the monitoring of the downlink control channel, and receive the multicast communication on one or both of the first cell or the second cell based on the monitoring of the downlink data channel.

Another apparatus for wireless communication is described. The apparatus may include means for receiving control signaling indicating a cell configuration associated with a first cell of a set of cells, the cell configuration including a scheduling configuration associated with both the first cell and a second cell of the set of cells for multicast communication, means for monitoring for a downlink control channel associated with the multicast communication on one or both of the first cell or the second cell based on the control signaling, means for monitoring for a downlink data channel associated with the multicast communication on one or both of the first cell or the second cell based on the monitoring of the downlink control channel, and means for receiving the multicast communication on one or both of the first cell or the second cell based on the monitoring of the downlink data channel.

A non-transitory computer-readable medium storing code for wireless communication at a UE is described. The code may include instructions executable by a processor to receive control signaling indicating a cell configuration associated with a first cell of a set of cells, the cell configuration including a scheduling configuration associated with both the first cell and a second cell of the set of cells for multicast communication, monitor for a downlink control channel associated with the multicast communication on one or both of the first cell or the second cell based on the control signaling, monitor for a downlink data channel associated with the multicast communication on one or both of the first cell or the second cell based on the monitoring of the downlink control channel, and receive the multicast communication on one or both of the first cell or the second cell based on the monitoring of the downlink data channel.

Some examples of the method, apparatuses, and non-transitory computer-readable medium described herein may further include operations, features, means, or instructions for enabling a cross-carrier scheduling for one or both of unicast communication or the multicast communication based on the scheduling configuration and where one or both of the monitoring of the downlink control channel or the monitoring of the downlink data channel may be based on the enabling of the cross-carrier scheduling for one or both of the unicast communication or the multicast communication.

In some examples of the method, apparatuses, and non-transitory computer-readable medium described herein, the receiving of the control signaling may include operations, features, means, or instructions for receiving a radio resource control (RRC) message including an RRC information element (IE) indicating the first cell or the second cell for the monitoring of the downlink control channel associated with the multicast communication and where the monitoring of the downlink control channel may be based on the receiving of the RRC message including the RRC IE indicating the first cell or the second cell.

Some examples of the method, apparatuses, and non-transitory computer-readable medium described herein may further include operations, features, means, or instructions for receiving the downlink control channel associated with the multicast communication on the second cell based on the monitoring of the downlink control channel on the second cell, and where the receiving of the multicast communication includes and receiving the downlink data channel associated with the multicast communication on the first cell based on the receiving of the downlink control channel on the second cell. In some examples of the method, apparatuses, and non-transitory computer-readable medium described herein, the downlink data channel includes a group-common multicast downlink data channel.

Some examples of the method, apparatuses, and non-transitory computer-readable medium described herein may further include operations, features, means, or instructions for receiving a downlink control channel configuration of the second cell associated with the monitoring of the downlink control channel, where a respective common frequency resource (CFR) associated with the monitoring of the downlink control channel may be configured on the second cell, and the respective CFR associated with the monitoring of the downlink data channel may be configured on the first cell and where the monitoring of the downlink control channel on the second cell may be based on the respective CFR associated with the monitoring of the downlink control channel configured on the second cell.

Some examples of the method, apparatuses, and non-transitory computer-readable medium described herein may further include operations, features, means, or instructions for receiving a downlink control channel configuration of the first cell associated with one or both of the monitoring of the downlink control channel or the monitoring of the downlink data channel, where a respective CFR associated with the monitoring of the downlink control channel may be configured on the first cell, and the respective CFR associated with the monitoring of the downlink data channel may be configured on the first cell and where the monitoring of the downlink control channel on the second cell may be based on the respective CFR associated with the monitoring of the downlink control channel configured on the first cell.

A method of wireless communication at a network entity is described. The method may include transmitting control signaling indicating a cell configuration associated with a first cell of a set of cells, the cell configuration including a scheduling configuration associated with both the first cell and a second cell of the set of cells for multicast communication, transmitting a downlink control channel associated with the multicast communication on one or both of the first cell or the second cell based on the control signaling, and transmitting a downlink data channel associated with the multicast communication on one or both of the first cell or the second cell based on the transmitting of the downlink control channel.

An apparatus of wireless communication is described. The apparatus may include a processor, memory coupled with the processor, and instructions stored in the memory. The instructions may be executable by the processor to cause the apparatus to transmit control signaling indicating a cell configuration associated with a first cell of a set of cells, the cell configuration including a scheduling configuration associated with both the first cell and a second cell of the set of cells for multicast communication, transmit a downlink control channel associated with the multicast communication on one or both of the first cell or the second cell based on the control signaling, and transmit a downlink data channel associated with the multicast communication on one or both of the first cell or the second cell based on the transmitting of the downlink control channel.

Another apparatus of wireless communication is described. The apparatus may include means for transmitting control signaling indicating a cell configuration associated with a first cell of a set of cells, the cell configuration including a scheduling configuration associated with both the first cell and a second cell of the set of cells for multicast communication, means for transmitting a downlink control channel associated with the multicast communication on one or both of the first cell or the second cell based on the control signaling, and means for transmitting a downlink data channel associated with the multicast communication on one or both of the first cell or the second cell based on the transmitting of the downlink control channel.

A non-transitory computer-readable medium storing code of wireless communication at a network entity is described. The code may include instructions executable by a processor to transmit control signaling indicating a cell configuration associated with a first cell of a set of cells, the cell configuration including a scheduling configuration associated with both the first cell and a second cell of the set of cells for multicast communication, transmit a downlink control channel associated with the multicast communication on one or both of the first cell or the second cell based on the control signaling, and transmit a downlink data channel associated with the multicast communication on one or both of the first cell or the second cell based on the transmitting of the downlink control channel.

BRIEF DESCRIPTION OF THE DRAWINGS

FIG. 14 shows a diagram of a system including a device that supports multicast communication with cross-carrier scheduling in accordance with one or more aspects of the present disclosure.

DETAILED DESCRIPTION

Figure 1:
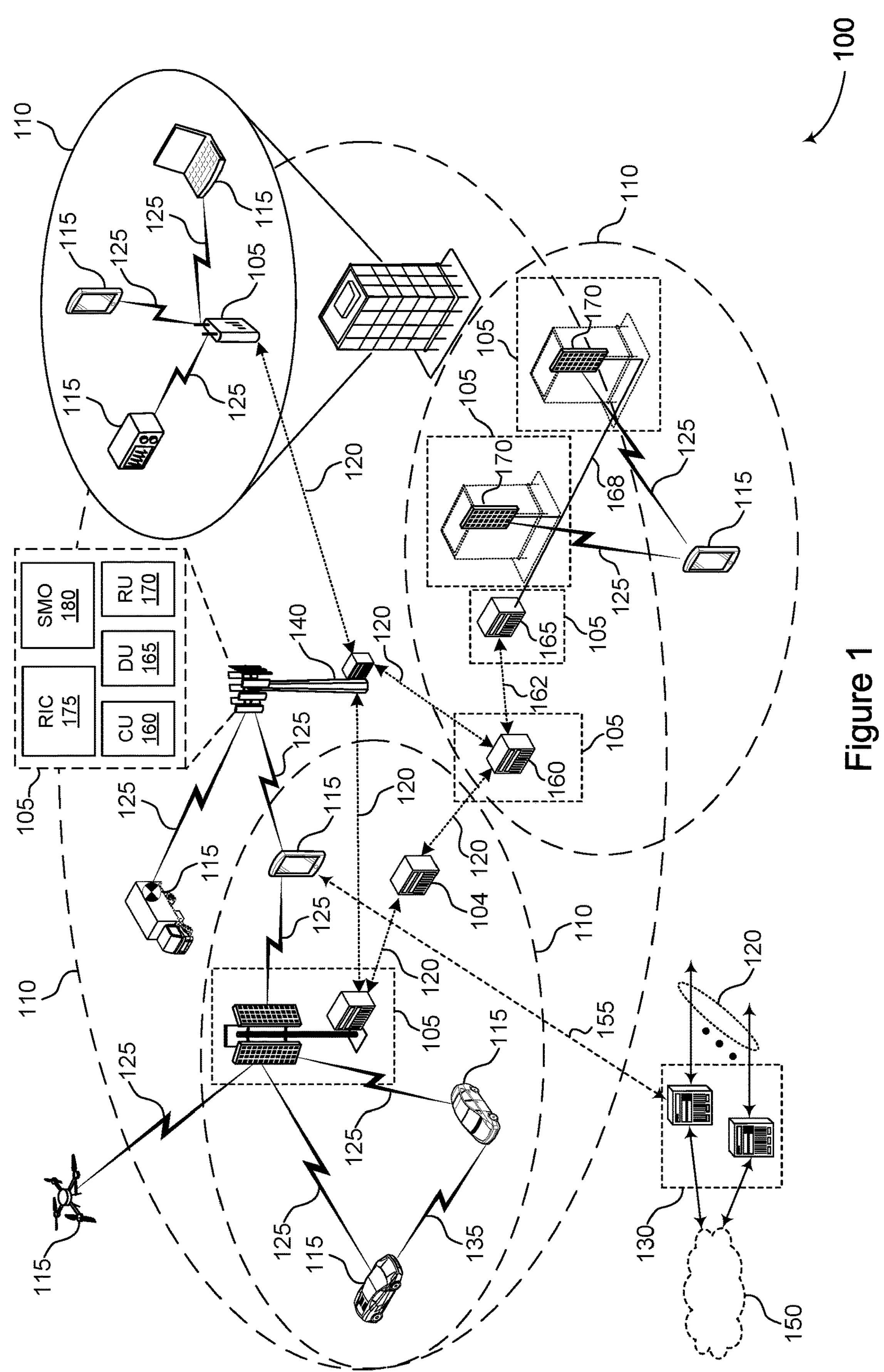
FIGS. 1 and 2 illustrate examples of wireless communication systems that support multicast communication with cross-carrier scheduling in accordance with one or more aspects of the present disclosure.

A wireless communication system may include communication devices, such as user equipments (UEs) and network entities that support wireless communication (for example, unicast communication or multicast communication) over one or more cells (for example, a primary cell and one or more secondary cells). In some examples, for multicast communication, a UE may support receiving a group-based downlink communication from a network entity. For unicast communication, the UE may support receiving a one-to-one downlink communication from the network entity. The UE may receive, via the one or more cells, control information over a control channel and data over a data channel. In some examples, the UE may support self-scheduling, which enables the UE to receive, on a cell, a downlink control channel (for example, a physical downlink control channel (PDCCH)) that schedules a downlink data channel (for example, a physical downlink shared channel (PDSCH)) on the same cell. In some examples, the UE may further support cross-carrier scheduling, which enables the UE to receive, on a first cell (for example, the primary cell), a downlink control channel (for example, a PDCCH) that schedules a downlink data channel (for example, a PDSCH) on a different, second cell (for example, one of the secondary cells). In some other examples, the first cell may be one of the secondary cells and the second cell may be the primary cell.

In some cases, due to the cross-carrier scheduling, the performance of the UE in receiving wireless communications (for example, multicast data on a downlink data channel) may be suboptimal. In some examples, on a first cell, the UE may not monitor for or receive a second downlink control channel (for example, a second PDCCH) on the first cell because the UE is performing ongoing downlink data reception on the first cell. In such cases, the UE may not receive scheduling resources included in the second downlink control channel for wireless communication, and, as a result, the UE may not receive the communication (for example, multicast data on a second PDSCH) on the second cell since the UE is unable to receive the second downlink control channel on the first cell.

Various aspects of the present disclosure generally relate to configuring a UE to support multicast downlink data reception, such as multicast physical downlink shared channel (PDSCH) reception, on a cell, in instances in which multicast downlink data reception on the cell is scheduled via cross-carrier scheduling. In some examples, the UE may receive, from a network entity, higher-layer control signaling (for example, radio resource control (RRC) signaling) including a cell configuration that may be used to support wireless communication on a cell, which may be a primary cell or a secondary cell. In some examples, the UE may receive the cell configuration on a first cell, and the cell configuration may indicate a scheduling configuration that enables cross-carrier scheduling for unicast communication, multicast communication, or both on a second cell. The scheduling configuration may be associated with the first cell and the second cell of a set of cells. In some such examples, the higher-layer control signaling may include an information element that contains a cell identifier of the first cell so that on the first cell the UE may monitor for a downlink control channel (for example, a PDCCH) that schedules a multicast communication (for example, a PDSCH) on the first or second cell. In some examples, the UE may receive separate scheduling configurations for unicast communication and multicast communication independently within the cell configuration.

Particular aspects of the subject matter described in this disclosure may be implemented to realize the following potential advantages. The techniques employed by the described communication devices may provide benefits and enhancements to the operation of the communication devices, including increased data rates, capacity, and spectral efficiency for communication. For example, operations performed by the described communication devices may enhance a cell configuration by indicating additional scheduling information to support communication on a cell (for example, a primary cell or a secondary cell) even in examples in which the cell is performing ongoing data reception. By indicating the additional scheduling information, the described communication devices may experience improved coordination. For example, a network entity may indicate to a UE one or more cells the UE should monitor for data reception. By receiving the additional scheduling information, the described communication devices may support the data reception in addition to ongoing data reception performed by the UE over a time duration. For example, based on the additional scheduling information, a UE may monitor for, or receive, a second downlink control channel on a cell over a time duration while performing ongoing downlink data reception on the same cell over the same time duration, providing increased capacity, data rates, and spectral efficiency for downlink communication, among other benefits.

Aspects of the disclosure are initially described in the context of wireless communication systems. Aspects of the disclosure are further illustrated by and described with reference to apparatus diagrams, system diagrams, and flowcharts that relate to multicast communication with cross-carrier scheduling.

FIG. 1 illustrates an example of a wireless communication system 100 that supports multicast communication with cross-carrier scheduling in accordance with one or more aspects of the present disclosure. The wireless communication system 100 may include one or multiple network entities 105, one or multiple UEs 115, and a core network 130. In some examples, the wireless communication system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or multiple communication links 125 (for example, a radio frequency (RF) access link). For example, a network entity 105 may support a coverage area 110 (for example, a geographic coverage area) over which the UEs 115 and the network entity 105 may establish one or multiple communication links 125. The coverage area 110 may be an example of a geographic area over which a network entity 105 and a UE 115 may support the communication of signals according to one or multiple radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

A node of the wireless communication system 100, which may be referred to as a network node, or a wireless node, may be a network entity 105 (for example, any network entity described herein), a UE 115 (for example, any UE described herein), a network controller, an apparatus, a device, a computing system, one or multiple components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system, may include disclosure of the UE 115, network entity 105, apparatus, device, or computing system, being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or multiple backhaul communication links 120 (for example, in accordance with an S1, N2, N3, or other interface protocol). In some examples, network entities 105 may communicate with one another over a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or multiple wired links (for example, an electrical link, an optical fiber link), one or multiple wireless links (for example, a radio link, a wireless optical link), among other examples or various combinations thereof. A UE 115 may communicate with the core network 130 through a communication link 155.

One or multiple of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or multiple network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending upon which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or multiple layers of the protocol stack and the DU 165 may support one or multiple different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or multiple DUs 165 or RUs 170, and the one or multiple DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or multiple layers of the protocol stack and the RU 170 may support one or multiple different layers of the protocol stack. The DU 165 may support one or multiple different cells (for example, via one or multiple RUs 170). In some examples, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or multiple DUs 165 via a midhaul communication link 162 (for example, F1, F1-c, F1-u), and a DU 165 may be connected to one or multiple RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication over such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some examples, in an IAB network, one or multiple network entities 105 (for example, IAB nodes 104) may be partially controlled by each other. One or multiple IAB nodes 104 may be referred to as a donor entity or an IAB donor. One or multiple DUs 165 or one or multiple RUs 170 may be partially controlled by one or multiple CUs 160 associated with a donor network entity 105 (for example, a donor base station 140). The one or multiple donor network entities 105 (for example, IAB donors) may be in communication with one or multiple additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or multiple components of the disaggregated RAN architecture (for example, one or multiple IAB nodes 104 or components of IAB nodes 104) may be configured to operate according to the techniques described herein.

For instance, an access network (AN) or RAN may include communication between access nodes (for example, an IAB donor), IAB nodes 104, and one or multiple UEs 115. The IAB donor may facilitate connection between the core network 130 and the AN (for example, via a wired or wireless connection to the core network 130). That is, an IAB donor may refer to a RAN node with a wired or wireless connection to core network 130. The IAB donor may include a CU 160 and at least one DU 165 (for example, and RU 170), in which case the CU 160 may communicate with the core network 130 over an interface (for example, a backhaul link). IAB donor and IAB nodes 104 may communicate over an F1 interface according to a protocol that defines signaling messages (for example, an F1 AP protocol). Additionally, or alternatively, the CU 160 may communicate with the core network over an interface, which may be an example of a portion of backhaul link, and may communicate with other CUs 160 (for example, a CU 160 associated with an alternative IAB donor) over an Xn-C interface, which may be an example of a portion of a backhaul link.

An IAB node 104 may refer to a RAN node that provides IAB functionality (for example, access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or multiple child nodes (for example, an IAB donor may relay transmissions for UEs through one or multiple other IAB nodes 104). Additionally, or alternatively, an IAB node 104 may also be referred to as a parent node or a child node to other IAB nodes 104, depending on the relay chain or configuration of the AN. The IAB-MT entity of IAB nodes 104 may provide a Uu interface for a child IAB node 104 to receive signaling from a parent IAB node 104, and the DU interface (for example, DUs 165) may provide a Uu interface for a parent IAB node 104 to signal to a child IAB node 104 or UE 115.

For example, IAB node 104 may be referred to as a parent node that supports communication for a child IAB node, and referred to as a child IAB node associated with an IAB donor. The IAB donor may include a CU 160 with a wired or wireless connection (for example, a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (for example, transmissions to the UEs 115 relayed from the IAB donor) through the DUs 165. That is, data may be relayed to and from IAB nodes 104 via signaling over an NR Uu interface to MT of the IAB node 104. communication with IAB node 104 may be scheduled by a DU 165 of IAB donor and communication with IAB node 104 may be scheduled by DU 165 of IAB node 104.

In the case of the techniques described herein applied in the context of a disaggregated RAN architecture, one or multiple components of the disaggregated RAN architecture may be configured to support multicast communication with cross-carrier scheduling. For example, some operations described as being performed by a UE 115 or a network entity 105 (for example, a base station 140) may additionally, or alternatively, be performed by one or multiple components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communication (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or multiple communication links 125 (for example, an access link) over one or multiple carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or multiple physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or multiple uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or multiple other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communication system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communication (for example, in an FDD mode) or may be configured to carry downlink and uplink communication (for example, in a TDD mode).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communication system 100 (for example, the network entities 105, the UEs 115, or both) may have hardware configurations that support communication over a particular carrier bandwidth or may be configurable to support communication over one of a set of carrier bandwidths. In some examples, the wireless communication system 100 may include network entities 105 or UEs 115 that support concurrent communication via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol duration (for example, a duration of one modulation symbol) and one subcarrier, in which case the symbol duration and subcarrier spacing (SCS) may be inversely related. The quantity of bits carried by each resource element may depend on the modulation scheme (for example, the order of the modulation scheme, the coding rate of the modulation scheme, or both) such that the more resource elements that a device receives and the higher the order of the modulation scheme, the higher the data rate may be for the device. A wireless communication resource may refer to a combination of an RF spectrum resource, a time resource, and a spatial resource (for example, a spatial layer, a beam), and the use of multiple spatial resources may increase the data rate or data integrity for communication with a UE 115.

One or multiple numerologies for a carrier may be supported, where a numerology may include an SCS ($\Delta f$) and a cyclic prefix. A carrier may be divided into one or multiple BWPs having the same or different numerologies. In some examples, a UE 115 may be configured with multiple BWPs. In some examples, a single BWP for a carrier may be active at a given time and communication for the UE 115 may be restricted to one or multiple active BWPs.

The time intervals for the network entities 105 or the UEs 115 may be expressed in multiples of a basic time unit, which may, for example, refer to a sampling duration of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on SCS. Each slot may include a quantity of symbol durations (for example, depending on the length of the cyclic prefix prepended to each symbol duration). In some wireless communication systems 100, a slot may further be divided into multiple mini-slots including one or multiple symbols. Excluding the cyclic prefix, each symbol duration may include one or multiple (for example, $N_f$) sampling durations. The duration of a symbol duration may depend on the SCS or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol durations in a TTI) may be variable. Additionally, or alternatively, the smallest scheduling unit of the wireless communication system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol durations and may extend across the system bandwidth or a subset of the system bandwidth of the carrier. One or multiple control regions (for example, CORESETs) may be configured for a set of the UEs 115. For example, one or multiple of the UEs 115 may monitor or search control regions for control information according to one or multiple search space sets, and each search space set may include one or multiple control channel candidates in one or multiple aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a particular UE 115.

A network entity 105 may provide communication coverage via one or multiple cells, for example a macro cell, a small cell, a hot spot, or other types of cells, or any combination thereof. The term "cell" may refer to a logical communication entity used for communication with a network entity 105 (for example, over a carrier) and may be associated with an identifier for distinguishing neighboring cells (for example, a physical cell identifier (PCID), a virtual cell identifier (VCID), or others). In some examples, a cell may also refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered network entity 105 (for example, a lower-powered base station 140), as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A network entity 105 may support one or multiple cells and may also support communication over the one or multiple cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a network entity 105 (for example, a base station 140, an RU 170) may be movable and provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network, in which different types of the network entities 105 provide coverage for various coverage areas 110 using the same or different radio access technologies.

The wireless communication system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communication from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communication (for example, a mode that supports one-way communication via transmission or reception, but not transmission and reception concurrently). In some examples, half-duplex communication may be performed at a reduced peak rate. Other power conservation techniques for the UEs 115 include entering a power saving deep sleep mode when not engaging in active communication, operating over a limited bandwidth (for example, according to narrowband communication), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communication system 100 may be configured to support ultra-reliable communication or low-latency communication, or various combinations thereof. For example, the wireless communication system 100 may be configured to support ultra-reliable low-latency communication (URLLC). The UEs 115 may be designed to support ultra-reliable, low-latency, or critical functions. Ultra-reliable communication may include private communication or group communication and may be supported by one or multiple services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (for example, in accordance with a peer-to-peer (P2P), D2D, or sidelink protocol). In some examples, one or multiple UEs 115 of a group that are performing D2D communication may be within the coverage area 110 of a network entity 105 (for example, a base station 140, an RU 170), which may support aspects of such D2D communication being configured by or scheduled by the network entity 105. In some examples, one or multiple UEs 115 in such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system, in which each UE 115 transmits to each of the other UEs 115 in the group. In some examples, a network entity 105 may facilitate the scheduling of resources for D2D communication. In some other examples, D2D communication may be carried out between the UEs 115 without the involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communication, vehicle-to-vehicle (V2V) communication, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or multiple network nodes (for example, network entities 105, base stations 140, RUs 170) using vehicle-to-network (V2N) communication, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or multiple network operators. The IP services 150 may include access to the Internet, Intranet(s), an IP Multimedia Subsystem (IMS), or a Packet-Switched Streaming Service.

The wireless communication system 100 may operate using one or multiple frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communication system 100 may support millimeter wave (mmW) communication between the UEs 115 and the network entities 105 (for example, base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or multiple different frequency regions, and designated use of bands across these frequency regions may differ by country or regulating body.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communication, or beamforming. The antennas of a network entity 105 or a UE 115 may be located within one or multiple antenna arrays or antenna panels, which may support MIMO operations or transmit or receive beamforming. For example, one or multiple base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communication with a UE 115. Likewise, a UE 115 may have one or multiple antenna arrays that may support various MIMO or beamforming operations. Additionally, or alternatively, an antenna panel may support RF beamforming for a signal transmitted via an antenna port.

The network entities 105 or the UEs 115 may use MIMO communication to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or multiple beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or multiple beam directions, and the feedback may correspond to a configured set of beams across a system bandwidth or one or multiple sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or multiple directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communication at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may establish a communication link with one or multiple cells, which may be examples of or controlled by one or multiple network entities 105. For example, the UE 115 may communicate with a first cell and a second cell of multiple cells in the wireless communication system 100. In this example, the first cell may be a secondary cell and the second cell may be a primary cell. The primary cell may operate on a primary component carrier, and the secondary cell may operate on a secondary component carrier. In some examples, multicast downlink data reception may be exclusive to primary cells. The primary cell or the secondary cell may be different for different UEs 115 in the wireless communication system 100. For example, a first UE 115 and a second UE 115 may occupy two coverage areas, which correspond to a first cell and a second cell. The first cell may serve as a primary cell for a first UE 115 and a secondary cell for a second UE 115. Additionally or alternatively, the second cell may serve as a secondary cell for the first UE 115 and a primary cell for the second UE 115. Because the primary cell varies among the first UE 115 and the second UE 115, the network entity 105 may send a first transmission for multicast downlink data reception on the first cell and send a second transmission for multicast downlink data reception on the second cell so that the first UE 115 and the second UE 115 may receive the multicast communication. Alternatively, the network entity 105 may reconfigure the primary cell for the UEs 115 so that the primary cell for the first UE 115 and the second UE 115 is the same and may be used for multicast downlink data reception. In some examples, in which the UEs 115 are configured with downlink carrier aggregation, the multicast downlink data reception may be enabled on the secondary cell respective to the UEs 115. In some examples, in which the UEs 115 are configured with downlink carrier aggregation, the first UE 115 and the second UE 115 may receive the multicast communication without having the network entity 105 to send multicast transmissions on both cells or to reconfigure the primary cell of the first UE 115 or the second UE 115.

In some examples, a UE 115 may support downlink data reception (for example, unicast or multicast communication) on a primary cell, a secondary cell, or both based on receiving higher layer control signaling (for example, RRC signaling) from a network entity 105. Additionally or alternatively, the UE 115 may support self-scheduling or cross-carrier scheduling for downlink data reception on the primary cell, the secondary cell, or both based on receiving a cell configuration including (or indicating) a scheduling configuration within the higher layer control signaling. For example, a scheduling configuration received by the UE 115 from a network entity 105 may enable the UE 115 to perform self-scheduling for multicast downlink data reception on the secondary cell. In other words, a control signaling may indicate a PDCCH on the secondary cell, which may include scheduling information regarding the multicast communication configured for the secondary cell. Additionally or alternatively, the scheduling configuration may enable the UE 115 to perform cross-carrier scheduling for multicast communication configured for the secondary cell. Put another way, the UE 115 may receive control signaling regarding multicast communication configured for the secondary cell in a PDCCH on the primary cell, which may include scheduling information regarding the multicast communication configured for the secondary cell.

In some examples, the behavior of the UE 115 may be unclear when configured with cross-carrier schedule upon receiving downlink data reception on a secondary cell. For instance, in cases in which a scheduling configuration configures the UE 115 with cross-carrier scheduling from the primary cell to the secondary cell for unicast or multicast downlink data reception on the secondary cell, the UE 115 may monitor the PDSCH on the secondary cell for the unicast or multicast downlink data reception. In some examples, the UE 115 may refrain from monitoring the PDCCH on the secondary cell for unicast or multicast downlink data reception on the primary cell or the secondary cell due to the cross-carrier scheduling that is configured from the primary cell to the secondary cell. Because the UE 115 may not be configured to monitor the PDCCH on the secondary cell via cross-carrier scheduling from the primary cell to the secondary cell, the UE 115 may miss opportunities to receive unicast or multicast communication on the primary cell and the secondary cell.

In some implementations, the UE 115 may receive a scheduling configuration that indicates a scheduling cell, which may monitor for a PDCCH that schedules multicast communication on a cell, which may be the same or different than the scheduling cell. In some aspects, the UE 115 may receive control signaling indicating a cell configuration associated with a first cell. The cell configuration may indicate a scheduling configuration associated with the first cell and a second cell. For example, the UE 115 may receive a scheduling configuration associated with a primary cell and a secondary cell by receiving control signaling. The control signaling may include a cell configuration associated with the primary cell or the secondary cell, and the cell configuration may indicate the scheduling configuration. Based on receiving the control signaling, the UE 115 may monitor for a PDCCH corresponding to multicast communication on the first cell, the second cell, or both. Based on monitoring the PDCCH, the UE 115 may monitor for a PDSCH corresponding to multicast communication on the first cell, the second cell, or both. Based on monitoring the PDCCH, the UE 115 may receive the multicast communication on the first cell, the second cell, or both. Additional details relating to the cell configuration that indicates the scheduling configuration in the control signaling are described herein, including with reference to FIGS. 2-4.

Figure 2:
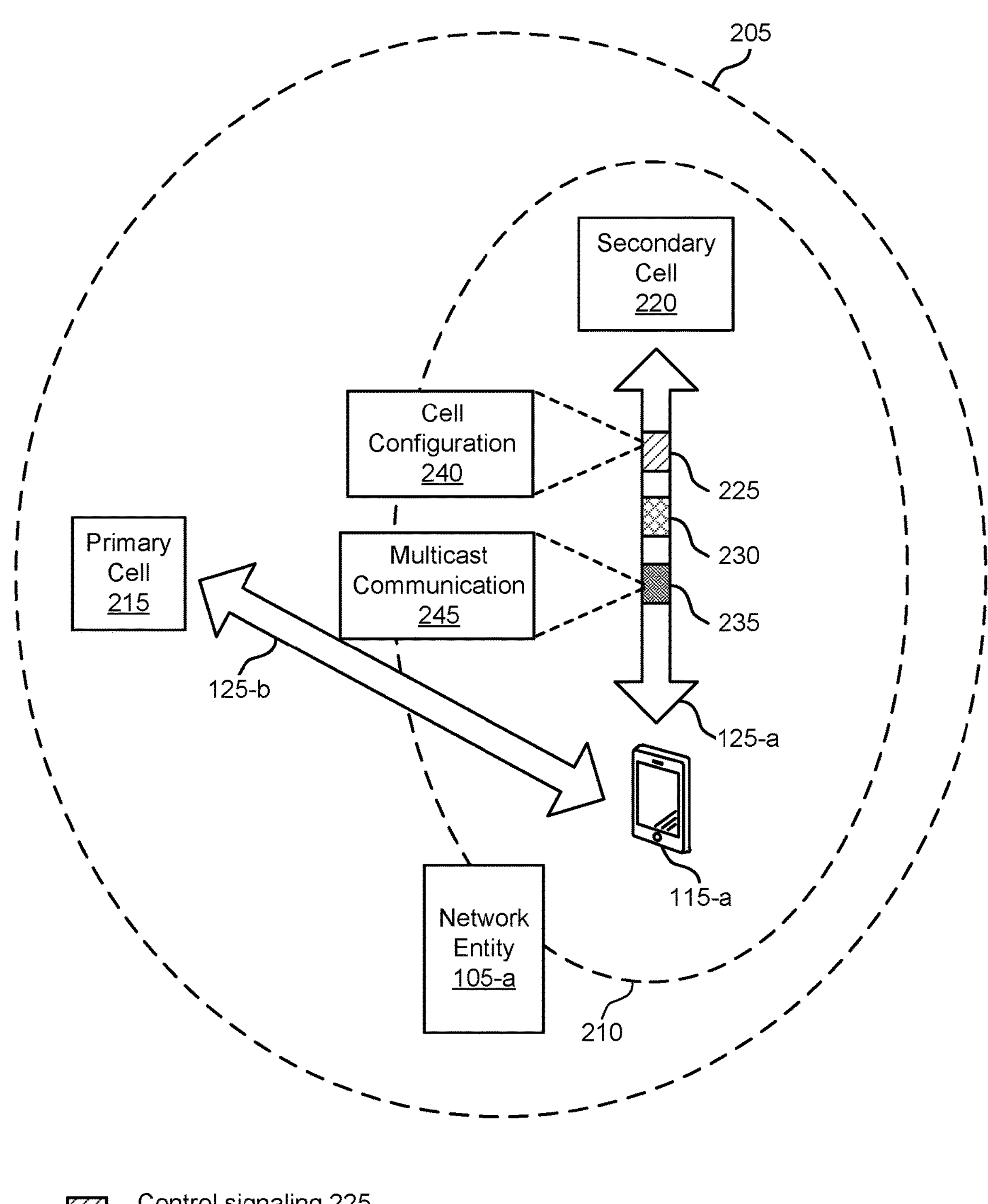

FIG. 2 illustrates an example of a wireless communication system 200 that supports multicast communication with cross-carrier scheduling in accordance with one or more aspects of the present disclosure. The wireless communication system 200 may implement or be implemented by aspects of the wireless communication system 100. For example, the wireless communication system 200 may include a UE 115-*a*, which may be an example of a UE 115 described with reference to FIG. 1. The wireless communication system 200 may also include a primary cell 215 and a secondary cell 220. In some aspects, the primary cell 215 and the secondary cell 220 may be associated with one or multiple network entities 105 described with reference to FIG. 1. In some examples, the primary cell 215 and the secondary cell 220 may be associated with a network entity 105-*a*. In other examples, the primary cell 215 and the secondary cell 220 may be associated with different network entities. In the wireless communication system 200, the UE 115-*a* may receive multicast communication based on receiving signaling from the primary cell 215, the secondary cell 220, or both.

In some examples, the primary cell 215 and the secondary cell 220 may be co-located, meaning that the primary cell 215 and the secondary cell 220 may cover the same coverage area. Alternatively, the primary cell 215 and the secondary cell 220 may be non-co-located, meaning that the primary cell 215 and the secondary cell 220 may cover different coverage areas. In the wireless communication system 200, the primary cell 215 may operate as a serving cell for a coverage area 205, and the secondary cell 220 may operate as a serving cell for a coverage area 210. FIG. 2 illustrates a non-co-located scenario because the coverage area 210 that corresponds to the secondary cell 220 may be located within the coverage area 205 that corresponds to the primary cell 215. In some examples, the secondary cell 220 may exchange signaling with the UE 115-*a* via a communication link 125-*a*. Additionally or alternatively, the primary cell 215 may exchange signaling with the UE 115-*a* via a communication link 125-*b* that connects the UE 115-*a* to the primary cell 215. The signaling exchanged between the UE 115-*a* and the secondary cell 220 via the communication link 125-*a* may also be exchanged between the UE 115-*a* and the primary cell 215 via the communication link 125-*b*, respectively.

In some implementations, the UE 115-*a* may receive wireless communication (for example, unicast or multicast data reception) on the primary cell 215, the secondary cell 220, or both based on receiving control signaling. In some aspects, the control signaling may include a cell configuration 240 corresponding to the primary cell 215 or the secondary cell 220 of a set of cells for multicast communication 245. The control signaling may be received by the UE 115-*a* through higher layer signaling (for example, an RRC message) on any cell in the wireless communications system 200. In some examples, the UE 115-*a* may receive a control signaling 225 from the secondary cell 220, and the control signaling 225 may indicate the cell configuration 240 (for example, ServingCellConfig) that corresponds to the secondary cell 220.

In some examples, the cell configuration 240 may indicate a scheduling cell on which scheduling resources for the multicast communication 245 may be received by indicating a scheduling configuration that corresponds to the primary cell 215, the secondary cell 220, or both. In some aspects, the scheduling configuration may be a higher layer parameter (for example, crossCarrierSchedulingConfig) of the cell configuration 240. The scheduling configuration may indicate a scheduling cell for a serving cell configured for downlink data reception. In some examples, the scheduling configuration may be configured to the cell configured for the downlink data reception. For instance, in which the UE 115-*a* is configured for multicast downlink data reception on the secondary cell 220, the UE 115-*a* may receive a scheduling configuration on the secondary cell 220. In some examples, the UE 115-*a* may enable a cross-carrier scheduling for communication in accordance with the received scheduling configuration. Based on the enabling of the cross-carrier scheduling, the UE 115-*a* may monitor for a PDCCH or monitor for a PDSCH on the primary cell 215, the secondary cell 220, or both. For example, the UE 115-*a* may monitor for a PDCCH on a scheduling cell, such as the primary cell 215 or the secondary cell 220, based on receiving an IE included in an RRC control message.

The scheduling configuration may be configured for the cell, which is configured for the configured wireless communication (for example, the multicast downlink data reception). In some examples, the UE 115-*a* may enable self-scheduling for the multicast communication 245 based on the control signaling 225. For instance, the UE 115-*a* may monitor for a PDCCH on the cell associated with the multicast communication 245 for cases, in which the network entity 105-*a* indicates “own” in an IE of an RRC control message to provide additional scheduling information in the control signaling 225 (for example, scheduling-CellInfo). Additionally or alternatively, the UE 115-*a* may enable cross-carrier scheduling for the wireless communication based on the control signaling 225. For instance, the UE 115-*a* may monitor for a PDCCH on a cell different than the cell configured for the multicast communication 245 in cases, in which the network entity 105-*a* indicates "other" in the IE of the RRC control message. Additionally or alternatively, the UE 115-*a* may monitor for a PDCCH on a cell, which may or may not be configured for the multicast communication 245 by indicating the cell ID of the scheduling cell in the IE of the RRC control message. The network entity 105-*a* may enhance the control signaling associated with the multicast communication 245 by indicating additional information regarding the scheduling cell.

By receiving the indication of the cell configuration 240 associated with the secondary cell 220 in the control signaling 225, the UE 115-*a* may receive an indication of the scheduling configuration associated with the primary cell 215 and the secondary cell 220. The UE 115-*a* may monitor for a PDCCH 230 associated with the wireless communication, as illustrated with reference to FIG. 2, in cases, in which the IE indicates the secondary cell 220 to be the scheduling cell. Based on monitoring the PDCCH 230 on the secondary cell 220, the UE 115-*a* may monitor for a PDSCH 235 associated with the multicast communication 245, as illustrated in FIG. 2. Alternatively, the UE 115-*a* may monitor for a PDCCH on the primary cell 215 for cases, in which the IE indicates the primary cell 215 to be the scheduling cell. Based on monitoring the PDCCH on the primary cell 215, the UE 115-*a* may monitor for a PDSCH 235 associated with the multicast communication 245.

Figure 3:
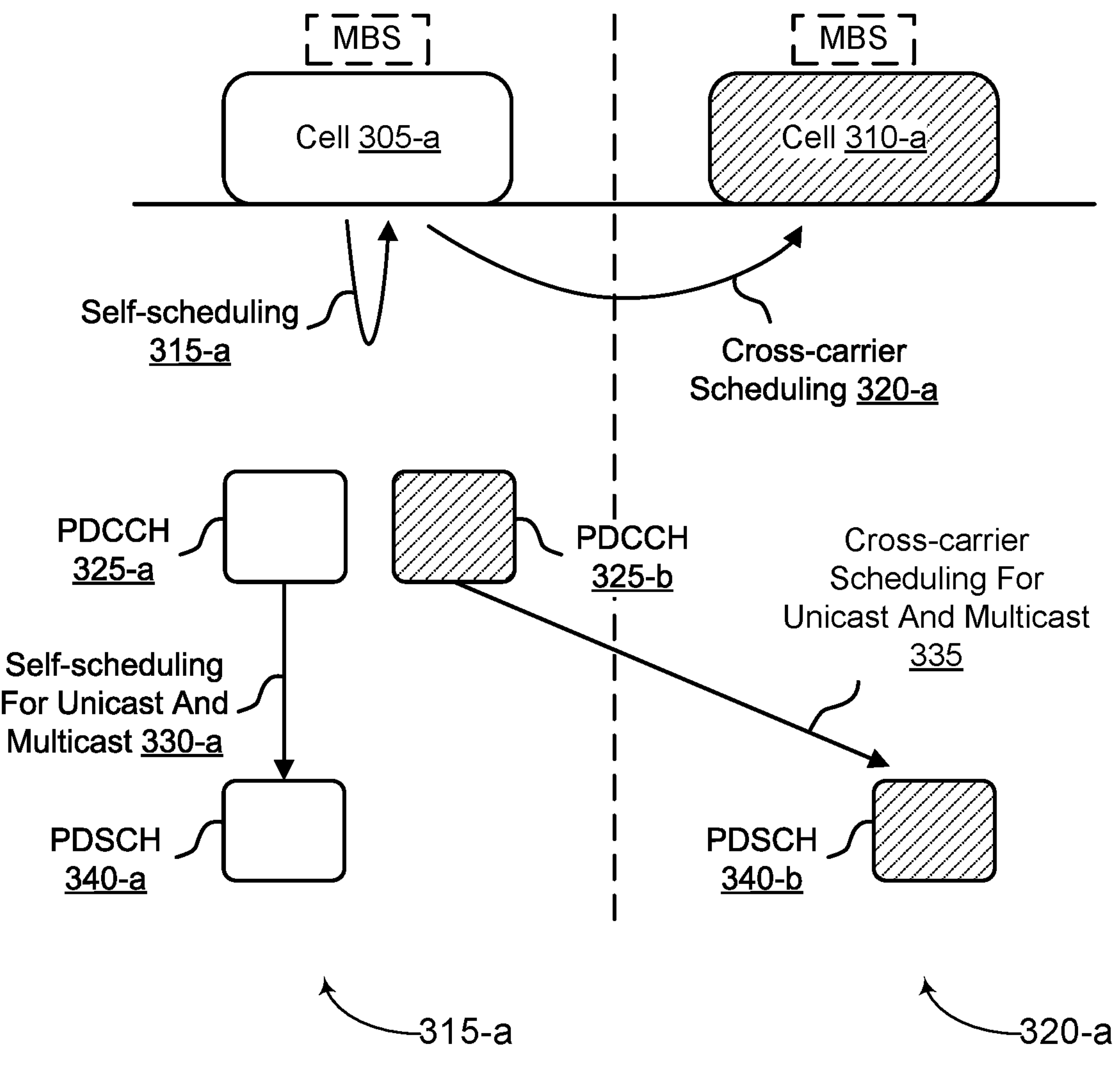
FIG. 3-5 illustrate examples of transmission schemes that support multicast communication with cross-carrier scheduling in accordance with aspects of the present disclosure.

FIG. 3 illustrates an example of a transmission scheme 300 that supports multicast communication with cross-carrier scheduling in accordance with one or more aspects of the present disclosure. The transmission scheme 300 may implement or be implemented by aspects of the wireless communication system 200. For example, the transmission scheme 300 may include a cell 305-*a* and a cell 310-*a*, which may be examples of a primary cell or a secondary cell described with reference to FIG. 2. In some examples, the cell 305-*a* and the cell 310-*a* may be associated with a same network entity 105. In other examples, the cell 305-*a* and the cell 310-*a* may be associated with different network entities 105. The transmission scheme 300 may include one or multiple PDCCHs 325 and PDSCHs 340. In some aspects, the one or multiple PDCCHs 325 may be associated with the PDCCH 230 as described with reference to FIG. 2. Additionally or alternatively, the one or multiple PDSCHs 340 may be associated with the PDSCH 235 as described with reference to FIG. 2. In the transmission scheme 300, a UE 115 may receive multicast communication via multicast and broadcast services (MBS) on more than one cell (for example, on the cell 305-*a* and on the cell 310-*a*) based on receiving signaling from the cell 305-*a*, the cell 310-*a*, or both.

In some examples, a network entity 105 may configure a UE 115 with a self-scheduling 315-*a* on the cell 305-*a* for multicast communication on the cell 305-*a*. For instance, the network entity 105 may configure the UE 115 with the self-scheduling 315-*a* via a scheduling configuration, which is indicated by a cell configuration associated with the cell 305-*a*. In some aspects, the network entity 105 may enable a self-scheduling for unicast and multicast 330-*a* by transmitting an RRC message including an IE that indicates the cell 305-*a* to be the scheduling cell. In some examples in which the cell 305-*a* is indicated as the scheduling cell, the UE 115 may receive scheduling information on the cell 305-*a* regarding communication that is enabled for the cell 305-*a*. The UE 115 may monitor for a PDCCH 325-*a* on the cell 305-*a*, and the PDCCH 325-*a* may include the scheduling information. In this example, the network entity 105 may configure CFRs on the cell 305-*a* for the purpose of receiving the PDCCH 325-*a* for multicast communication. Based on monitoring for the PDCCH 325-*a*, the UE 115 may receive the PDCCH 325-*a*. Based on monitoring for and receiving the PDCCH 325-*a* on the cell 305-*a*, the UE 115 may monitor for and receive a PDSCH 340-*a* on the cell 305-*a*. By receiving the PDSCH 340-*a* on the cell 305-*a*, the UE 115 may receive the multicast communication on the cell 305-*a*.

In some examples, the network entity 105 may configure the UE 115 with a cross-carrier scheduling 320-*a* on the cell 310-*a* for multicast communication on the cell 310-*a*. For instance, the network entity 105 may configure the UE 115 with the cross-carrier scheduling 320-*a* from the cell 305-*a* to the cell 310-*a* via a scheduling configuration, which is indicated by a cell configuration associated with the cell 310-*a*. In some aspects, the network entity 105 may enable a cross-carrier scheduling for unicast and multicast 335 based on the scheduling configuration by transmitting an RRC message including an IE that indicates the cell 305-*a* to be the scheduling cell. In some examples, in which the cell 305-*a* is indicated as the scheduling cell, the UE 115 may receive scheduling information on the cell 305-*a* regarding unicast and multicast communication that is enabled for the cell 310-*a*. The UE 115 may monitor for a PDCCH 325-*b* on the cell 305-*a*, and the PDCCH 325-*b* may include the scheduling information. In this example, the network entity 105 may configure CFRs on the cell 305-*a* for the purpose of receiving the PDCCH 325-*b* for multicast communication. Based on monitoring for the PDCCH 325-*b*, the UE 115 may receive the PDCCH 325-*b*. Based on receiving the PDCCH 325-*b* on the cell 305-*a*, the UE 115 may monitor for and receive a PDSCH 340-*b* on the cell 310-*a*. By receiving the PDSCH 340-*b* on the cell 310-*a*, the UE 115 may receive the multicast communication on the cell 310-*a*.

In some examples, the network entity 105 may provide PDCCH monitoring related configurations, such as the scheduling configuration indicated by the control signaling, by configuring CFRs on the cell 305-*a* and the cell 310-*a*. In such examples, a first scheduling configuration configured on the cell 305-*a* and a second scheduling configuration on the cell 310-*a* may be used to identify the PDCCH 325-*b*. For instance, the first scheduling configuration on the cell 305-*a* may provide a CORESET configuration, and the second scheduling configuration on the cell 310-*a* may provide a search space set configuration.

Figure 4:
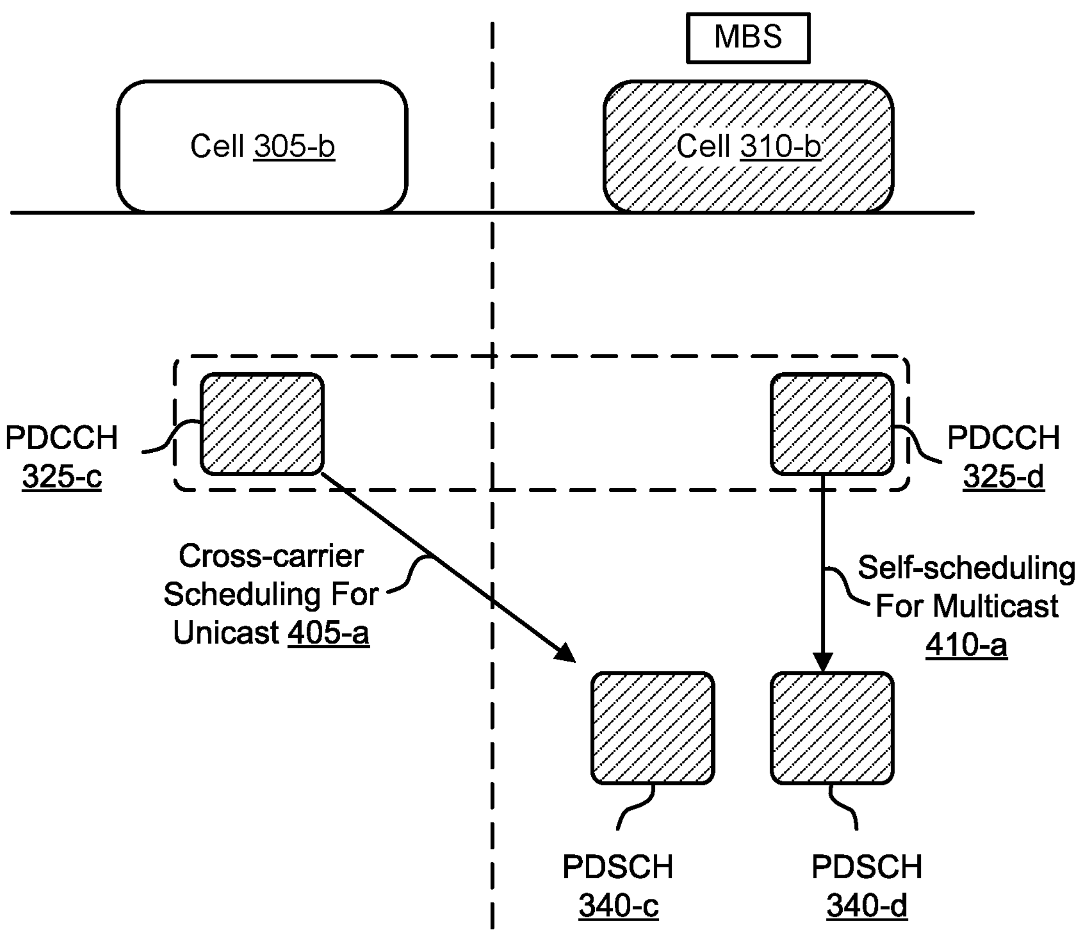
Figure 4:

FIG. 4 illustrates an example of a transmission scheme 400 that supports multicast communication with cross-carrier scheduling in accordance with one or more aspects of the present disclosure. The transmission scheme 400 may implement or be implemented by aspects of the wireless communication system 200. For example, the transmission scheme 400 may include a cell 305-*b* and a cell 310-*b*, which may be examples of a primary cell or a secondary cell described with reference to FIG. 2. In some examples, the cell 305-*b* and the cell 310-*b* may be associated with a same network entity 105. In other examples, the cell 305-*b* and the cell 310-*b* may be associated with different network entities 105. The transmission scheme 400 may also include one or multiple PDCCHs 325 and one or multiple PDSCHs 340. In some aspects, the one or multiple PDCCHs 325 may be associated with the PDCCH 230 as described with reference to FIG. 2. Additionally or alternatively, the one or multiple PDSCHs 340 may be associated with the PDSCH 235 as described with reference to FIG. 2.

In the transmission scheme 400, a UE 115 may receive multicast communication via MBS based on receiving signaling from the cell 310-*b*. In some examples, the UE 115 may monitor for a PDCCH associated with unicast communication, such as a PDCCH 325-*c*, a PDCCH associated with multicast communication, such as a PDCCH 325-*d*, or both based on receiving control signaling from a network entity 105. Based on monitoring the PDCCH 325-*c* associated with the unicast communication, the PDCCH 325-*d* associated with the multicast communication, or both, the UE 115 may receive the unicast communication, the multicast communication, or both. For example, the network entity 105 may use the scheduling configuration on the cell 305-*b* to configure the UE 115 with a cross-carrier scheduling for unicast 405-*a* from the cell 305-*b* to the cell 310-*b*. Additionally or alternatively, the network entity 105 may use the scheduling configuration on the cell 310-*b* to configure the UE 115 with a self-scheduling for multicast 410-*a* on the cell 310-*b*. In some examples, in which the UE 115 may be configured with the cross-carrier scheduling for unicast 405-*a* and the self-scheduling for multicast 410-*a*, the network entity 105 may configure the UE 115-*a* with two scheduling cells. That is, the network entity 105-*a* may distribute time and frequency resources amongst the cell 305-*b* and the cell 310-*b* to provide for monitoring of the PDCCH 325-*c* and the PDCCH 325-*d*.

In some aspects, the UE 115-*a* may monitor the PDCCH 325-*c* and the PDCCH 325-*d* based on determining a number of blind decodes (BD), a number of CCEs that are not overlapping each other for channel estimation, or both. By determining the number of BDs, the number of CCEs, or both, the UE 115-*a* may gather scheduling information related to the communication configured for PDSCH 340-*c* and the PDSCH 340-*d*. For instance, in some examples, the network entity 105 may determine a first number of CCEs for monitoring of the PDCCH 325-*c*, which is associated with the cross-carrier scheduling for unicast 405-*a*, and a second number of CCEs for monitoring of the PDCCH 325-*d*, which may be associated with the self-scheduling for multicast 410-*a*. In some examples, the network entity 105 may determine a first threshold number of CCEs for monitoring of the PDCCH 325-*c* and a second threshold number of CCEs for monitoring of the PDCCH 325-*d*. Additionally or alternatively, the network entity 105 may determine a first SCS for the monitoring of the PDCCH 325-*c* over a TTI, and a second SCS for the monitoring of the PDCCH 325-*d* over the TTI. The network entity 105 may configure the UE 115 with the determined number of BDs or CCEs, or both, for monitoring of the PDCCH 325-*c* and the PDCCH 325-*d* via the control signaling. For example, the network entity 105 may configure the UE 115 with {44, 36, 22, 20} BDs or CCEs, or both for the SCS {15, 30, 60, 120} kHz to be used for monitoring of the PDCCH 325-*c* for the cross-carrier scheduling for unicast 405-*a* from the cell 305-*b* to the cell 310-*b*. Additionally or alternatively, the network entity 105 may configure the UE 115 with {44, 36, 22, 20} BDs or CCEs, or both, for the SCS {15, 30, 60, 120} kHz to be used for monitoring of the PDCCH 325-*d* for the self-scheduling for multicast 410-*a* on the cell 310-*b*.

In some examples, the network entity 105 may determine the first threshold number of CCEs for the monitoring of the PDCCH 325-*c* and the second threshold number of CCEs for the monitoring of the PDCCH 325-*d* based on a sum of the first number of CCEs associated with the PDCCH 325-*c* and the second number of CCEs associated with the PDCCH 325-*d*. Additionally or alternatively, the network entity 105 may determine a reference SCS, such as {15, 30, 60, 120} kHz. In some examples, in which the first SCS of the PDCCH 325-*c* and the second SCS of the PDCCH 325-*d* are the same, the reference SCS may be equivalent to the first SCS and the second SCS. In some examples, in which the first SCS of the PDCCH 325-*c* and the second SCS of the PDCCH 325-*d* are different, the reference SCS may be the smaller or larger SCS of the first SCS of the PDCCH 325-*c* and the second SCS of the PDCCH 325-*d*.

In some aspects, the network entity 105-*a* may include, in the control signaling, an indication of a splitting ratio for allocating a number of time and frequency resources (for example, for the cross-carrier scheduling for unicast 405-*a* or for the self-scheduling for multicast 410-*a*) of the sum of the first number of CCEs associated with the PDCCH 325-*c* and the second number of CCEs associated with the PDCCH 325-*d*. For instance, the network entity 105 may configure a first RRC parameter in the control signaling to indicate to the UE 115 a splitting ratio of BDs or CCEs, or both, to be used for the cross-carrier scheduling for unicast 405-*a*. Additionally or alternatively, the network entity 105 may configure a second RRC parameter in the control signaling to indicate to the UE 115 a splitting ratio of BDs/CCEs to be used for the self-scheduling for multicast 410-*a*.

The network entity 105 may configure the UE 115 such that the simultaneous monitoring (or processing) of the PDCCH 325-*c* and the PDCCH 325-*d* may or may not be required. In some examples, the UE 115 may support the simultaneous monitoring (or processing) of the PDCCH 325-*c* for the cross-carrier scheduling for unicast 405-*a* and of the PDCCH 325-*d* for the self-scheduling for multicast 410-*a*. For example, the UE 115 may support monitoring of the PDCCH 325-*c* and monitoring of the PDCCH 325-*d* in the same slot or on the same OFDM symbol(s). In other examples, the network entity 105 may configure the UE 115 such that the UE 115 may refrain from simultaneous monitoring (or processing) of the PDCCH 325-*c* and the PDCCH 325-*d*. For instance, the UE 115 may refrain from monitoring the PDCCH 325-*c* on the cell 305-*b* based on receiving the control signaling from the network entity 105-*a*. Alternatively, the UE 115 may refrain from monitoring the PDCCH 325-*d* on the cell 310-*b* based on receiving the control signaling from the network entity 105.

Based on monitoring for the PDCCH 325-*c* on the cell 305-*b*, the UE 115 may receive the PDCCH 325-*c* on the cell 305-*b*. Based on monitoring for and receiving the PDCCH 325-*c* on the cell 305-*b*, the UE 115 may monitor for and receive a PDSCH 340-*c* on the cell 310-*b*. By receiving the PDSCH 340-*c* on the cell 310-*b*, the UE 115 may receive the multicast communication on the cell 310-*b*. Based on monitoring for the PDCCH 325-*d* on the cell 310-*b*, the UE 115 may receive the PDCCH 325-*d* on the cell 310-*b*. Based on monitoring for and receiving the PDCCH 325-*d* on the cell 310-*b*, the UE 115 may monitor for and receive a PDSCH 340-*d* on the cell 310-*b*. By receiving the PDSCH 340-*d* on the cell 310-*b*, the UE 115 may receive the multicast communication on the cell 310-*b*.

Figure 5:
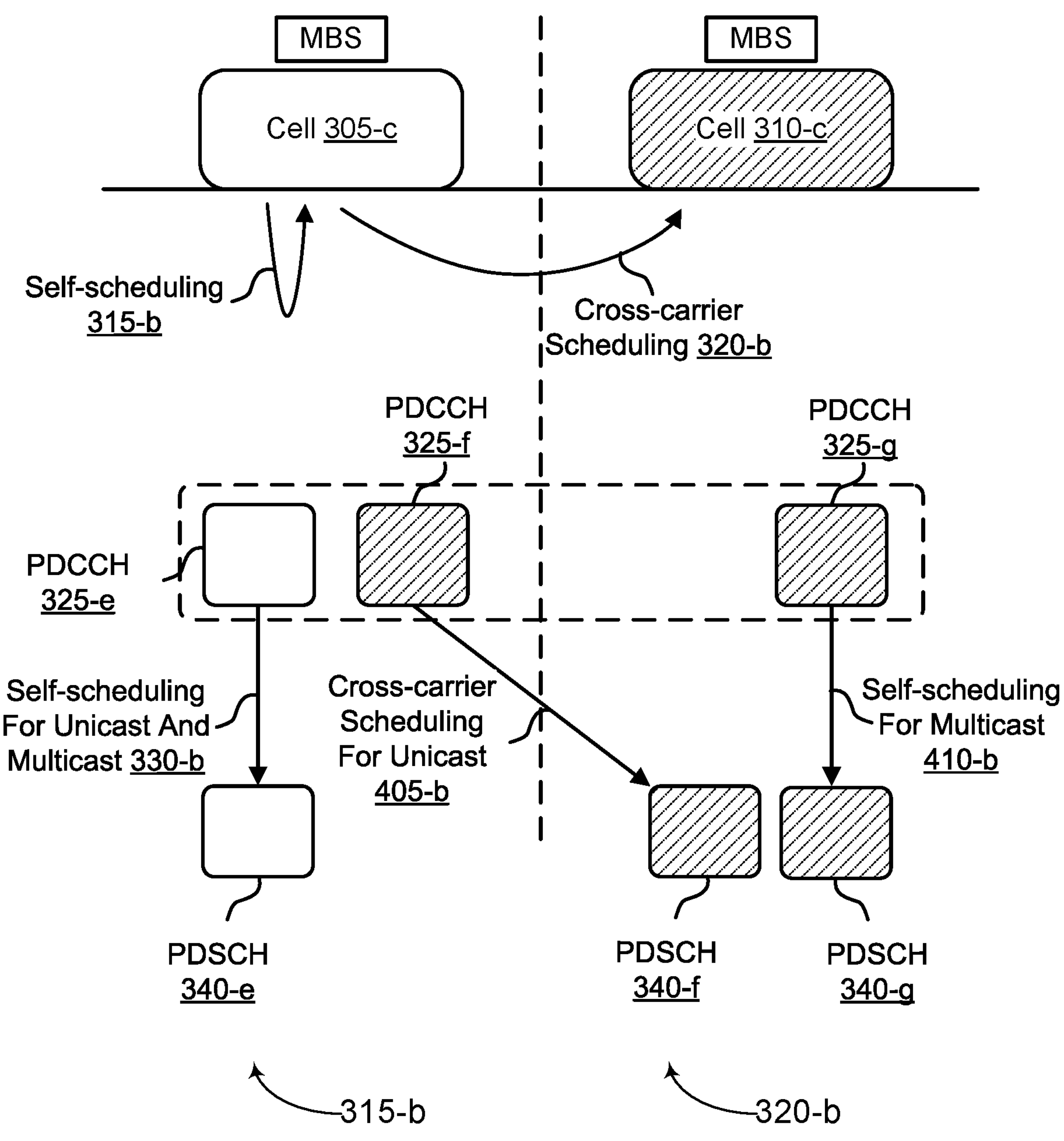

FIG. 5 illustrates an example of a transmission scheme 500 that supports multicast communication with cross-carrier scheduling in accordance with one or more aspects of the present disclosure. The transmission scheme 500 may implement or be implemented by aspects of the wireless communication system 200. For example, the transmission scheme 500 may include a cell 305-*c* and a cell 310-*c*, which may be examples of a primary cell or a secondary cell as described with reference to FIG. 2. In some examples, the cell 305-*c* and the cell 310-*c* may be associated with a same network entity 105. In other examples, the cell 305-*c* and the cell 310-*c* may be associated with different network entities 105. The transmission scheme 500 may also include one or multiple PDCCHs 325 and one or multiple PDSCHs 340. In some aspects, the one or multiple PDCCHs 325 may be associated with the PDCCH 230 described with reference to FIG. 2. Additionally or alternatively, the one or multiple PDSCHs 340 may be associated with the PDSCH 235 described with reference to FIG. 2.

In the transmission scheme 500, a UE 115 may receive multicast communication via MBS based on receiving signaling from the cell 305-*c*, the cell 310-*c* or both. A network entity 105 may configure the UE 115 for a self-scheduling 315-*b* on the cell 305-*c* for multicast communication on the cell 305-*c* via a scheduling configuration, which is indicated by a cell configuration associated with the cell 305-*c*. For instance, the UE 115 may receive an RRC message including an RRC IE that indicates the cell 305-*c* as the scheduling cell for multicast communication on the cell 305-*c*. Additionally or alternatively, the network entity 105 may configure the UE 115 for a cross-carrier scheduling 320-*b* from the cell 305-*c* to the cell 310-*c* for multicast communication on the cell 310-*c* via a scheduling configuration, which is indicated by a cell configuration associated with the cell 310-*c*. For instance, the UE 115 may receive an RRC message including an RRC IE that indicates the cell 305-*c* as the scheduling cell for multicast communication on the cell 310-*c*.

In some examples, the network entity 105 may configure the UE 115 with multicast communication on the cell 305-*c* and on the cell 310-*c*. In such cases, the network entity 105 may transmit a PDCCH including scheduling information for multicast communication on the cell, which multicast downlink data reception is configured to occur, respectively. That is, the UE 115 may refrain from monitoring of a PDCCH for cross-carrier scheduling for multicast or monitoring of a PDCCH for cross-carrier scheduling for unicast and multicast for cases, in which multicast communication is configured for the cell 305-*c* and the cell 310-*c*, and in which the scheduling configuration indicated by the cell configuration on a first cell (for example, the cell 305-*c*) indicates the scheduling cell to be a second cell (for example, the cell 310-*c*). For example, the network entity 105 may configure the UE 115 with a self-scheduling for unicast and multicast 330-*b* on the cell 305-*c* via a scheduling configuration on the cell 305-*c*, and the network entity 105 may configure the UE 115 with a self-scheduling for multicast 410-*b* on the cell 310-*c* via a scheduling configuration on the cell 310-*c*. In this example, the scheduling configuration on the cell 305-*c* may indicate the cell 305-*c* as a scheduling cell for the self-scheduling for unicast and multicast 330-*b* on the cell 305-*c*. Additionally or alternatively, the scheduling configuration on the cell 310-*c* may indicate a cell 310-*c* as a scheduling cell for the self-scheduling for multicast 410-*b* on the cell 310-*c*. Based on the scheduling configuration on the cell 305-*c*, the UE 115 may receive the unicast and multicast communication on the cell 305-*c* by monitoring and receiving a PDCCH 325-*e* and a PDSCH 340-*e*. Based on the scheduling configuration on the cell 310-*c*, the UE 115 may receive the multicast communication on the cell 310-*c* by monitoring and receiving a PDCCH 325-*g* and a PDSCH 340-*g*.

Additionally or alternatively, the network entity 105 may transmit a first PDCCH and a second PDCCH including scheduling information for unicast communication by indicating a single scheduling cell for a scheduled cell. For example, the network entity 105 may configure the UE 115 for a cross-carrier scheduling for unicast 405-*b* from the cell 305-*c* to the cell 310-*c* and the self-scheduling for unicast and multicast 330-*b* on the cell 305-*c*. In this example, the scheduling configuration on the cell 305-*c* may indicate the cell 305-*c* as the scheduling cell for the self-scheduling for unicast and multicast 330-*b*. Additionally or alternatively, the scheduling configuration on the cell 310-*c* may indicate the cell 305-*c* as the scheduling cell for the cross-carrier scheduling for unicast 405-*b*. Based on the scheduling configuration on the cell 305-*c*, the UE 115 may receive the unicast and multicast communication on the cell 305-*c* by monitoring and receiving a PDCCH 325-*e* and a PDSCH 340-*e*. Based on the scheduling configuration on the cell 310-*c*, the UE 115 may receive the unicast communication on the cell 310-*c* by monitoring and receiving a PDCCH 325-*f* on the cell 305-*c* and a PDSCH 340-*f* on the cell 310-*c*.

In some implementations, the network entity 105 may configure cross-carrier scheduling and self-scheduling for unicast and multicast communication independently. In other words, the UE 115 may determine a separate cross-carrier scheduling configuration for unicast communication and multicast communication. In some aspects, the UE 115 may determine the cross-carrier scheduling configuration for the unicast communication based on an indication in the cell configuration indicating cross-carrier scheduling for the unicast communication (for example, crossCarrierSchedulingConfig). Additionally or alternatively, the UE 115 may determine the cross-carrier scheduling configuration for the multicast communication based on an indication in the cell configuration indicating cross-carrier scheduling for the multicast communication (for example, crossCarrierSchedulingConfig-multicast).

Figure 6:
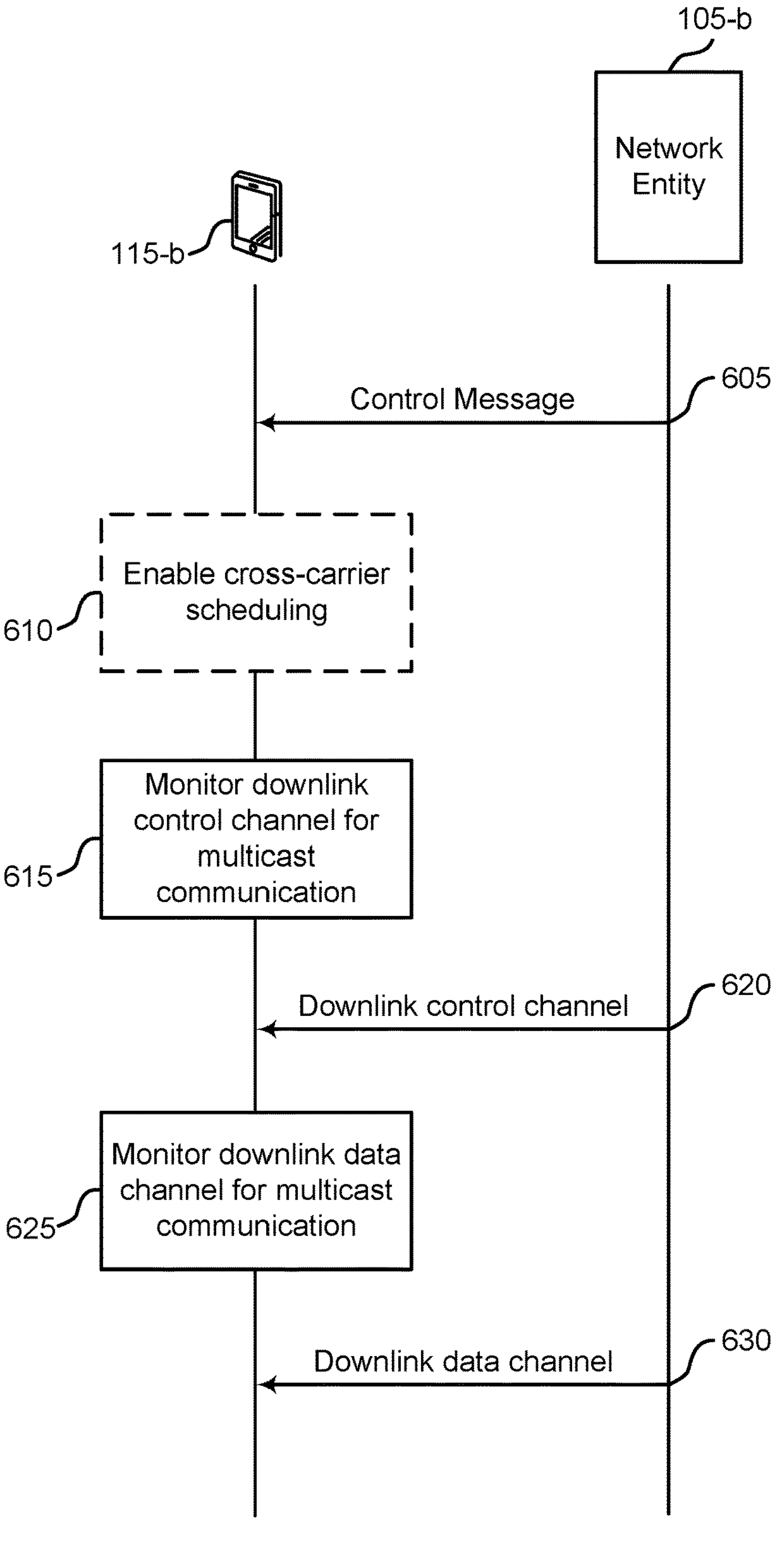
FIG. 6 illustrates an example of a process flow that supports multicast communication with cross-carrier scheduling in accordance with aspects of the present disclosure.

FIG. 6 illustrates an example of a process flow 600 that supports multicast communication with cross-carrier scheduling in accordance with one or more aspects of the present disclosure. In some examples, the process flow 600 may implement aspects of the wireless communication systems 100 and 200. For example, the process flow 600 may include example operations associated with a UE 115-*b* or a network entity 105-*b*, which may be examples of the corresponding devices described with reference to FIGS. 1 and 2. In the following description of the process flow 600, the operations between the UE 115-*b* and the network entity 105-*b* may be performed in a different order than the example order shown, or the operations performed by the UE 115-*b* and the network entity 105-*b* may be performed in different orders or at different times. Some operations may also be omitted from the process flow 600, and other operations may be added to the process flow 600. The operations performed by the UE 115-*b* and the network entity 105-*b* may support improvement to the UE 115-*b* communication operations and, in some examples, may promote improvements to the UE 115-*b* implementation of cross-carrier scheduling, among other benefits.

At 605, the network entity 105-*b* may transmit, and the UE 115-*b* may receive, a control message. The control message may indicate a cell configuration associated with a first cell of a set of cells for multicast communication, and the cell configuration may indicate a scheduling configuration associated with the first cell and a second cell of the set of cells. In cases in which the multicast communication is configured for the first cell, the UE 115-*b* may receive the control message indicating the cell configuration associated with the first cell. The cell configuration associated with the first cell may indicate the scheduling configuration associated with both the first and the second cell.

In some examples, the control message may indicate the first cell or the second cell as the scheduling cell, which the UE 115-*b* may use to monitor for a PDCCH associated with the multicast communication. For instance, the control signaling may include an RRC message, which includes an RRC IE. The RRC IE may indicate the first cell or the second cell as the scheduling cell. Based on providing the RRC IE in the RRC message, the network entity 105-*b* may provide additional information regarding the scheduling cell within the scheduling configuration that is indicated by the cell configuration in the control signaling.

Additionally or alternatively, the UE 115-*b* may determine a separate cross-scheduling configuration for unicast communication and the multicast communication independently based on an indication in the cell configuration of the control message. That is, the network entity 105-*b* may indicate cross-carrier scheduling of the unicast communication or the multicast communication, which may each be associated with the first cell or the second cell. The UE 115-*b* may monitor the PDCCH, the PDSCH, or both based on the separate cross-carrier scheduling configuration for the unicast communication and the multicast communication, At 610, the UE 115-*b* may enable a cross-carrier scheduling for unicast communication, multicast communication, or both on the second cell based on the scheduling configuration indicated by the cell configuration. For example, the UE 115-*b* may enable cross-carrier scheduling for multicast communication on the first cell via the scheduling configuration indicated by the cell configuration on the first cell. For cases, in which the network entity 105-*b* indicates the second cell to be the scheduling cell in the control signaling, the UE 115-*b* may enable cross-carrier scheduling for the multicast communication on the first cell.

At 615, the UE 115-*b* may monitor for a PDCCH for multicast communication on the first cell, the second cell, or both based on the control signaling. In some examples, the UE 115-*b* may monitor the PDCCH based on receiving the RRC message including the RRC IE, which indicates the scheduling cell. Additionally or alternatively, monitoring of the PDCCH may be based on whether or not the UE 115-*b* enables cross-carrier scheduling for unicast communication, multicast communication, or both. In cases, in which the UE 115-*b* enables the cross-carrier scheduling for multicast communication on the first cell based on receiving the RRC message in the control signaling, the UE 115-*b* may monitor for a PDCCH on the second cell in order to receive scheduling information associated with the multicast communication configured for the first cell.

In some examples, the network entity 105-*b* may transmit, and the UE 115-*b* may receive, a PDCCH configuration of the first cell, the second cell, or both. The PDCCH configuration may be associated with the monitoring of the PDCCH. By transmitting the PDCCH configuration, the network entity 105-*b* may configure a CFR associated with monitoring of the PDCCH on the first cell and a CFR associated with monitoring of the PDCCH on the second cell. In some examples, in which the control message indicates that the UE 115-*b* may monitor the PDCCH on the second cell to receive scheduling information associated with the multicast communication on the first cell (in other words, for cases in which the control message indicates that the UE 115-*b* may perform cross-carrier scheduling for the multicast communication configured on the first cell), the UE 115-*b* may receive a PDCCH configuration of the second cell associated with the monitoring of the PDCCH. Based on receiving the PDCCH configuration of the second cell, the respective CFR associated with monitoring of the PDCCH may be configured on the second cell, and the respective CFR associated with monitoring of a PDSCH may be configured on the first cell. The UE 115-*b* may monitor the PDCCH on the second cell based on the respective CFR associated with the monitoring of the PDCCH configured on the second cell.

In some examples, the network entity 105-*b* may transmit, and the UE 115-*b* may receive, a downlink control configuration of the first cell associated with the monitoring of the PDCCH, the monitoring of the PDSCH, or both. For instance, in cases, in which the control message indicates that the UE 115-*b* may monitor the PDCCH on the first cell to receive scheduling information associated with the multicast communication on the first cell, the UE 115-*b* may receive a PDCCH configuration of the first cell associated with one or both of the monitoring of the PDCCH or the monitoring of the PDSCH. Based on receiving the PDCCH configuration of the first cell, the respective CFR associated with monitoring of the PDCCH may be configured on the first cell, and the respective CFR associated with monitoring of a PDSCH may be configured on the first cell. The UE 115-*b* may monitor the PDCCH on the second cell based on the respective CFR associated with the monitoring of the PDCCH configured on the first cell.

In some examples, the network entity 105-*b* may transmit, and the UE 115-*b* may receive, a respective PDCCH configuration of each of the first cell and the second cell associated with the monitoring of the PDCCH. In such examples, the respective CFR associated with the monitoring of the PDCCH on the second cell may be configured on both the first cell and the second cell. The UE 115-*b* may monitor the PDCCH on the second cell based on receiving the respective PDCCH configuration of each of the first cell and the second cell. The respective PDCCH configuration of each of the first cell and the second cell may include at least a first PDCCH configuration of the first cell indicating a CORESET configuration. Additionally, the respective PDCCH configuration of each of the first cell and the second cell may include at least a second PDCCH configuration of the second cell indicating a search space set configuration.

In some examples, the network entity 105-*b* may transmit, and the UE 115-*b* may receive, the PDCCH configuration of the first cell within a cross-carrier scheduling configuration that is indicated in the scheduling configuration of the control message. Based on receiving the cross-carrier scheduling configuration included within the scheduling configuration on the first cell, the UE 115-*b* may receive a PDCCH configuration of the first cell. Based on receiving the PDCCH configuration on the first cell, the UE 115-*b* may monitor the PDCCH on the first cell.

At 620, the network entity 105-*b* may transmit, and the UE 115-*b* may receive, a PDCCH that is associated with the multicast communication on the first cell, the second cell, or both based on transmitting the control message at 605. The UE 115-*b* may receive the PDCCH based on monitoring for the PDCCH.

At 625, the network entity 105-*b* may monitor for a PDSCH for multicast communication on the first cell, the second cell, or both based on monitoring the PDCCH at 615. In some examples, the network entity 105-*b* may monitor the PDSCH based on enabling the cross-carrier scheduling for the unicast communication, the multicast communication, or both at 610.

At 630, the network entity 105-*b* may transmit, and the UE 115-*b* may receive, a PDSCH that is associated with the multicast communication on the first cell, the second cell, or both based on the PDCCH at 620. For example, in cases in which the network entity 105-*b* configured the UE 115-*b* with cross-carrier scheduling for multicast communication on the first cell, the UE 115-*b* may receive the PDSCH associated with the multicast communication on the first cell. In cases in which the PDSCH may be associated with multicast communication, the PDSCH may be a group-common multicast PDSCH. In some examples, in which the network entity 105-*b* may configure the UE 115-*b* to receive multicast communication, the network entity 105-*b* may transmit, and the UE 115-*b* may receive, the multicast communication on the first cell, the second cell, or both. The UE 115-*b* may receive the multicast communication based on monitoring and receiving the PDSCH on the cell configured for the multicast communication.

At 635, the network entity 105-*b* may transmit, and the UE 115-*b* may receive, multicast communication on one or both of the first cell of the second cell. The UE 115-*b* may receive the multicast communication based on the monitoring of the PDSCH. In some examples, the UE 115-*b* may receive the multicast communication on the first cell based on monitoring the PDSCH on the first cell. Additionally or alternatively, the UE 115-*b* may receive the multicast communication on the second cell based on monitoring the PDSCH on the second cell.

Figure 7:
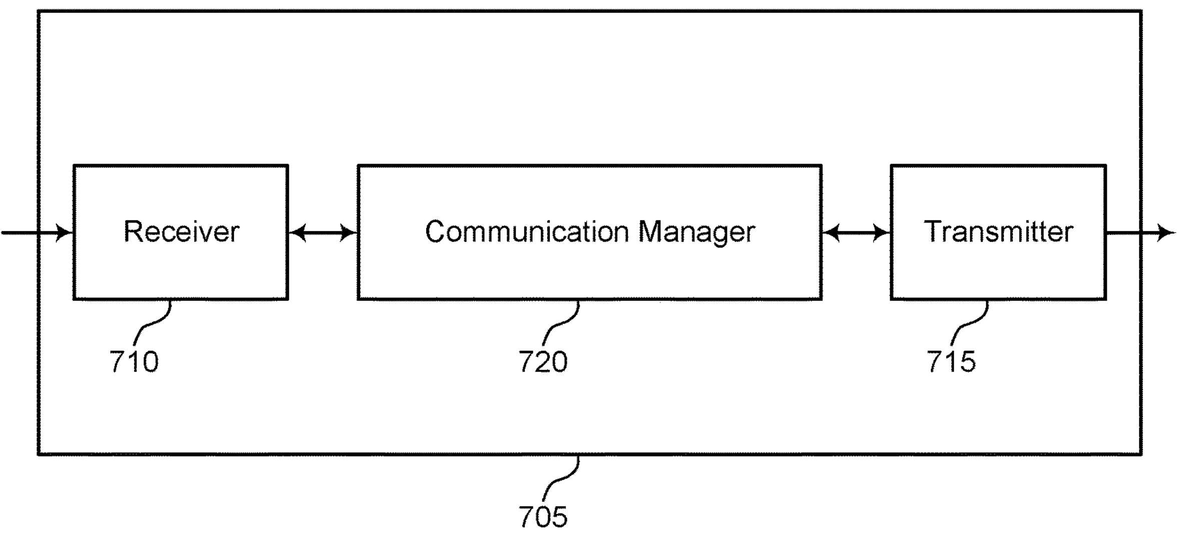
FIGS. 7 and 8 show block diagrams of devices that support multicast communication with cross-carrier scheduling in accordance with one or more aspects of the present disclosure.

FIG. 7 shows a block diagram of a device 705 that supports multicast communication with cross-carrier scheduling in accordance with one or more aspects of the present disclosure. The device 705 may be an example of aspects of a UE 115. The device 705 may include a receiver 710, a transmitter 715, and a communication manager 720. The communication manager 720 can be implemented, at least in part, by one or both of a modem and a processor. Each of these components may be in communication with one another (for example, via one or multiple buses).

The receiver 710 may provide a means for receiving information such as packets, user data, control information, or any combination thereof associated with various information channels (for example, control channels, data channels, information channels related to multicast communication with cross-carrier scheduling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to multicast communication with cross-carrier scheduling). In some examples, the transmitter 715 may be co-located with a receiver 710 in a transceiver component. The transmitter 715 may utilize a single antenna or a set of multiple antennas.

The communication manager 720, the receiver 710, the transmitter 715, or various combinations thereof or various components thereof may be examples of means for performing various aspects of multicast communication with cross-carrier scheduling. For example, the communication manager 720, the receiver 710, the transmitter 715, or various combinations or components thereof may support a method for performing one or more of the functions described herein.

In some examples, the communication manager 720, the receiver 710, the transmitter 715, or various combinations or components thereof may be implemented in hardware (for example, in communication management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communication manager 720, the receiver 710, the transmitter 715, or various combinations or components thereof may be implemented in code (for example, as communication management software or firmware) executed by a processor. Such as examples in which implemented in code executed by a processor, the functions of the communication manager 720, the receiver 710, the transmitter 715, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communication manager 720 may be configured to perform various operations (for example, receiving, obtaining, monitoring, outputting, transmitting) using or otherwise in cooperation with the receiver 710, the transmitter 715, or both. For example, the communication manager 720 may receive information from the receiver 710, send information to the transmitter 715, or be integrated in combination with the receiver 710, the transmitter 715, or both to obtain information, output information, or perform various other operations.

The communication manager 720 may support wireless communication at the device 705 (for example, a UE) in accordance with examples as disclosed herein. For example, the communication manager 720 may be configured as or otherwise support a means for receiving control signaling indicating a cell configuration associated with a first cell of a set of cells, the cell configuration including a scheduling configuration associated with both the first cell and a second cell of the set of cells for multicast communication. The communication manager 720 may be configured as or otherwise support a means for monitoring for a downlink control channel associated with the multicast communication on one or both of the first cell or the second cell based on the control signaling. The communication manager 720 may be configured as or otherwise support a means for monitoring for a downlink data channel associated with the multicast communication on one or both of the first cell or the second cell based on the monitoring of the downlink control channel. The communication manager 720 may be configured as or otherwise support a means for receiving the multicast communication on one or both of the first cell or the second cell based on the monitoring of the downlink data channel.

By including or configuring the communication manager 720 in accordance with examples as described herein, the device 705 (for example, a processor controlling or otherwise coupled with one or more of the receiver 710, the transmitter 715, or the communication manager 720) may support techniques for reduced power consumption.

Figure 8:
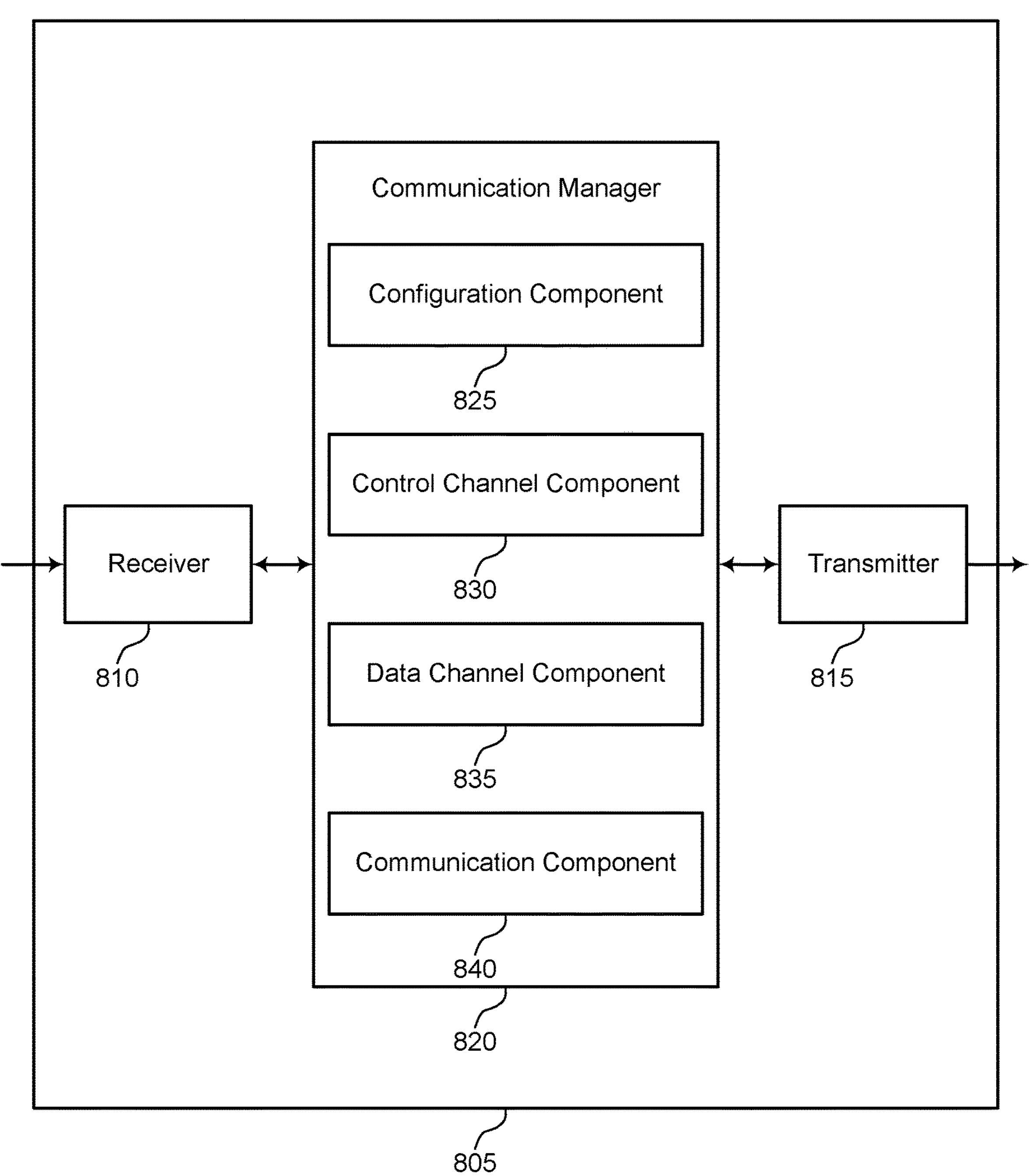

FIG. 8 shows a block diagram of a device 805 that supports multicast communication with cross-carrier scheduling in accordance with one or more aspects of the present disclosure. The device 805 may be an example of aspects of a device 705 or a UE 115. The device 805 may include a receiver 810, a transmitter 815, and a communication manager 820. The communication manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to multicast communication with cross-carrier scheduling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to multicast communication with cross-carrier scheduling). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of multicast communication with cross-carrier scheduling. For example, the communication manager 820 may include a configuration component 825, a control channel component 830, a data channel component 835, a communication component 840, or any combination thereof. In some examples, the communication manager 820, or various components thereof, may be configured to perform various operations (for example, receiving, obtaining, monitoring, outputting, transmitting) using or otherwise in cooperation with the receiver 810, the transmitter 815, or both. For example, the communication manager 820 may receive information from the receiver 810, send information to the transmitter 815, or be integrated in combination with the receiver 810, the transmitter 815, or both to obtain information, output information, or perform various other operations.

The communication manager 820 may support wireless communication at the device 805 (for example, a UE) in accordance with examples as disclosed herein. The configuration component 825 may be configured as or otherwise support a means for receiving control signaling indicating a cell configuration associated with a first cell of a set of cells, the cell configuration including a scheduling configuration associated with both the first cell and a second cell of the set of cells for multicast communication. The control channel component 830 may be configured as or otherwise support a means for monitoring for a downlink control channel associated with the multicast communication on one or both of the first cell or the second cell based on the control signaling. The data channel component 835 may be configured as or otherwise support a means for monitoring for a downlink data channel associated with the multicast communication on one or both of the first cell or the second cell based on the monitoring of the downlink control channel. The communication component 840 may be configured as or otherwise support a means for receiving the multicast communication on one or both of the first cell or the second cell based on the monitoring of the downlink data channel.

Figure 9:
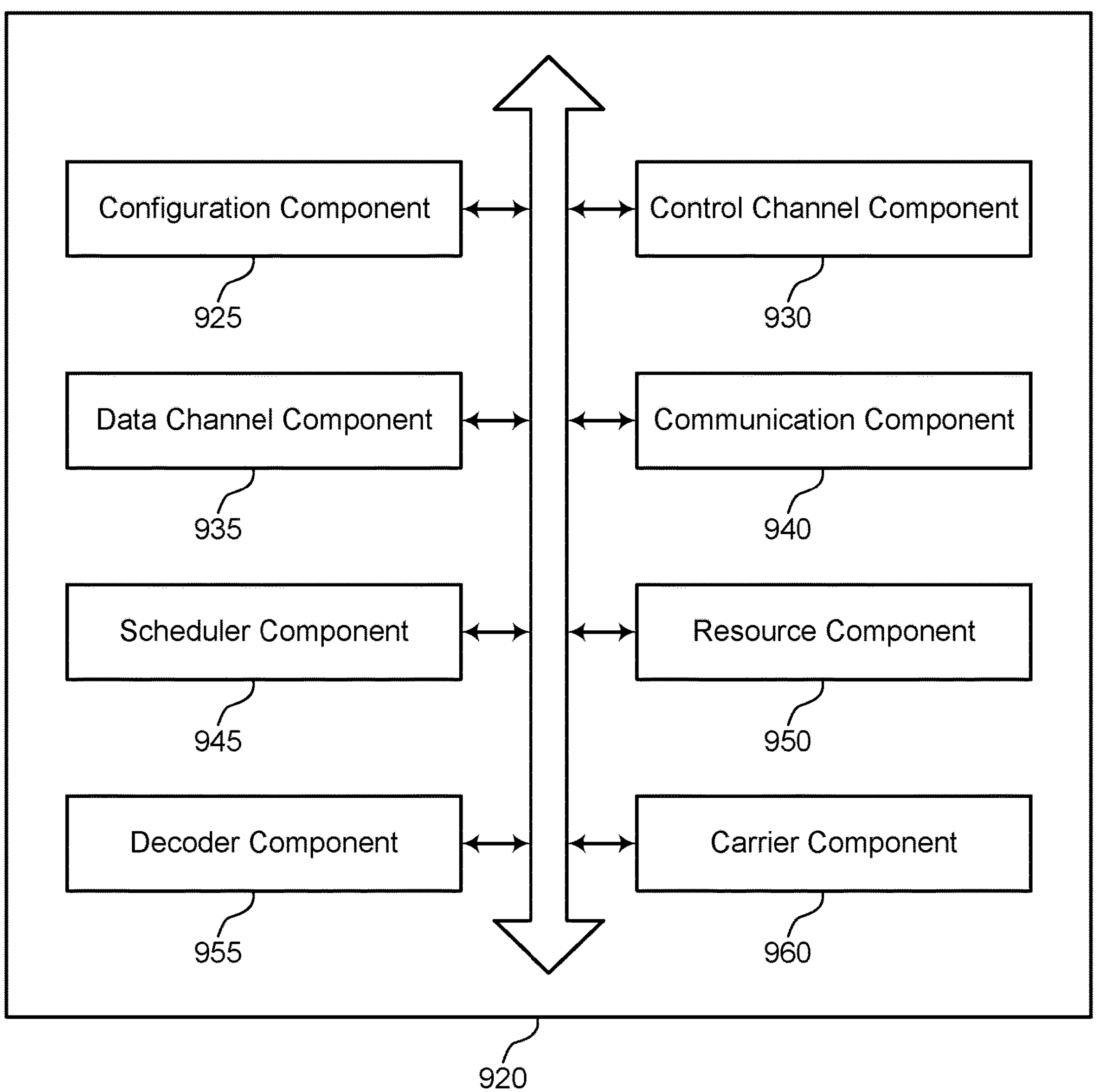
FIG. 9 shows a block diagram of a communication manager that supports multicast communication with cross-carrier scheduling in accordance with one or more aspects of the present disclosure.

FIG. 9 shows a block diagram of a communication manager 920 that supports multicast communication with cross-carrier scheduling in accordance with one or more aspects of the present disclosure. The communication manager 920, or various components thereof, may be an example of means for performing various aspects of multicast communication with cross-carrier scheduling. For example, the communication manager 920 may include a configuration component 925, a control channel component 930, a data channel component 935, a communication component 940, a scheduler component 945, a resource component 950, a decoder component 955, a carrier component 960, or any combination thereof. Each of these components may communicate, directly or indirectly, with one another (for example, via one or more buses).

The communication manager 920 may support wireless communication at a UE in accordance with examples as disclosed herein. The configuration component 925 may be configured as or otherwise support a means for receiving control signaling indicating a cell configuration associated with a first cell of a set of cells, the cell configuration including a scheduling configuration associated with both the first cell and a second cell of the set of cells for multicast communication. The control channel component 930 may be configured as or otherwise support a means for monitoring for a downlink control channel associated with the multicast communication on one or both of the first cell or the second cell based on the control signaling. The data channel component 935 may be configured as or otherwise support a means for monitoring for a downlink data channel associated with the multicast communication on one or both of the first cell or the second cell based on the monitoring of the downlink control channel. The communication component 940 may be configured as or otherwise support a means for receiving the multicast communication on one or both of the first cell or the second cell based on the monitoring of the downlink data channel.

In some examples, the scheduler component 945 may be configured as or otherwise support a means for enabling a cross-carrier scheduling for one or both of unicast communication or the multicast communication based on the scheduling configuration. In some examples, one or both of the monitoring of the downlink control channel or the monitoring of the downlink data channel is based on the enabling of the cross-carrier scheduling for one or both of the unicast communication or the multicast communication.

In some examples, to support receiving of the control signaling, the configuration component 925 may be configured as or otherwise support a means for receiving an RRC message including an RRC IE indicating the first cell or the second cell for the monitoring of the downlink control channel associated with the multicast communication. In some examples, monitoring of the downlink control channel is based on the receiving of the RRC message including the RRC IE indicating the first cell or the second cell.

In some examples, the control channel component 930 may be configured as or otherwise support a means for receiving the downlink control channel associated with the multicast communication on the second cell based on the monitoring of the downlink control channel on the second cell. In some examples, the data channel component 935 may be configured as or otherwise support a means for receiving the downlink data channel associated with the multicast communication on the first cell based on the receiving of the downlink control channel on the second cell. In some examples, the downlink data channel includes a group-common multicast downlink data channel.

In some examples, the configuration component 925 may be configured as or otherwise support a means for receiving a downlink control channel configuration of the second cell associated with the monitoring of the downlink control channel, where a respective CFR associated with the monitoring of the downlink control channel is configured on the second cell, and the respective CFR associated with the monitoring of the downlink data channel is configured on the first cell. In some examples, the control channel component 930 may be configured as or otherwise support a means for monitoring of the downlink control channel on the second cell based on the respective CFR associated with the monitoring of the downlink control channel configured on the second cell.

In some examples, the configuration component 925 may be configured as or otherwise support a means for receiving a downlink control channel configuration of the first cell associated with one or both of the monitoring of the downlink control channel or the monitoring of the downlink data channel, where a respective CFR associated with the monitoring of the downlink control channel is configured on the first cell, and the respective CFR associated with the monitoring of the downlink data channel is configured on the first cell. In some examples, the control channel component 930 may be configured as or otherwise support a means for monitoring of the downlink control channel on the second cell based on the respective CFR associated with the monitoring of the downlink control channel configured on the first cell.

In some examples, the configuration component 925 may be configured as or otherwise support a means for receiving a respective downlink control channel configuration of each of the first cell and the second cell associated with the monitoring of the downlink control channel, where a respective CFR associated with the monitoring of the downlink control channel on the second cell is configured on the first cell and the second cell. In some examples, the control channel component 930 may be configured as or otherwise support a means for monitoring of the downlink control channel on the second cell based on the receiving of the respective downlink control channel configuration of each of the first cell and the second cell.

In some examples, the respective downlink control channel configuration of each of the first cell and the second cell includes at least a first downlink control channel configuration of the first cell indicating a control resource set configuration and at least a second downlink control channel configuration of the second cell indicating a search space set configuration.

In some examples, the scheduler component 945 may be configured as or otherwise support a means for receiving scheduling information for the multicast communication associated with the downlink data channel based on the monitoring of the downlink control channel associated with the multicast communication. In some examples, the communication component 940 may be configured as or otherwise support a means for receiving the multicast communication based on the receiving of the scheduling information for the multicast communication.

In some examples, the scheduling configuration includes a cross-carrier scheduling configuration, and the configuration component 925 may be configured as or otherwise support a means for receiving a downlink control channel configuration of the first cell associated with the monitoring of the downlink control channel, the downlink control channel configuration being configured on the first cell. In some examples, the scheduling configuration includes a cross-carrier scheduling configuration, and the control channel component 930 may be configured as or otherwise support a means for monitoring of the downlink control channel on the first cell based on the receiving of the downlink control channel configuration of the first cell.

In some examples, to support receiving the multicast communication, the communication component 940 may be configured as or otherwise support a means for receiving the multicast communication on the first cell based on the monitoring of the downlink data channel on the first cell. In some examples, the communication component 940 may be configured as or otherwise support a means for receiving unicast communication on the first cell based on the monitoring of the downlink control channel on the second cell.

In some examples, the resource component 950 may be configured as or otherwise support a means for determining a number of time and frequency resources associated with the monitoring of the downlink control channel on one or both of the first cell or the second cell. In some examples, the control channel component 930 may be configured as or otherwise support a means for monitoring of the downlink control channel on one or both of the first cell or the second cell based on the determining of the number of time and frequency resources associated with the monitoring of the downlink control channel on one or both of the first cell or the second cell.

In some examples, the carrier component 960 may be configured as or otherwise support a means for determining a SCS associated with the monitoring of the downlink control channel on one or both of the first cell or the second cell over a TTI. In some examples, the resource component 950 may be configured as or otherwise support a means for determining of the number of time and frequency resources associated with the monitoring of the downlink control channel on one or both of the first cell or the second cell based on the determining of the SCS.

In some examples, the number of time and frequency resources comprises a sum of a first number of CCEs associated with the monitoring of the downlink control channel on the first cell and a second number of CCEs associated with the monitoring of the downlink control channel on the second cell. In some examples, the control signaling includes an indication of a ratio for allocating a respective number of time and frequency resources of the sum to cross-carrier scheduling associated with the first cell and the second cell.

In some examples, the decoder component 955 may be configured as or otherwise support a means for determining a number of blind decodes, a number of BD candidates, or a number of PDCCH candidates, or any combination thereof, associated with the monitoring of the downlink control channel on one or both of the first cell or the second cell. In some examples, the control channel component 930 may be configured as or otherwise support a means for monitoring of the downlink control channel on one or both of the first cell or the second cell based on the determining of blind decodes, the number of BD candidates, or the number of PDCCH candidates, or any combination thereof.

In some examples, the control channel component 930 may be configured as or otherwise support a means for one or both of monitoring a respective downlink control channel associated with unicast communication on the first cell or monitoring the downlink control channel associated with the multicast communication on the second cell based on the control signaling, the method further including. In some examples, the communication component 940 may be configured as or otherwise support a means for receiving one or both of the unicast communication or the multicast communication on the first cell based on one or both of the monitoring of the respective downlink control channel associated with the unicast communication on the first cell or the monitoring of the downlink control channel associated with the multicast communication on the second cell.

In some examples, the control channel component 930 may be configured as or otherwise support a means for refraining from monitoring the downlink control channel on the first cell or the second cell based on the received control signaling. In some examples, the control channel component 930 may be configured as or otherwise support a means for monitoring of the downlink control channel based on the refraining from the monitoring of the downlink control channel on the first cell or the second cell. In some examples, the scheduling configuration includes scheduling information associated with the multicast communication on the second cell and receiving the multicast communication on the first cell or on the second cell.

In some examples, the scheduler component 945 may be configured as or otherwise support a means for determining a separate cross-carrier scheduling configuration for unicast communication and the multicast communication based on an indication in the cell configuration indicating cross-carrier scheduling for the unicast communication or the multicast communication associated with the first cell or the second cell. In some examples, one or both of the monitoring of the downlink control channel or the monitoring of the downlink data channel is based on the separate cross-carrier scheduling configuration for the unicast communication and the multicast communication.

Figure 10:
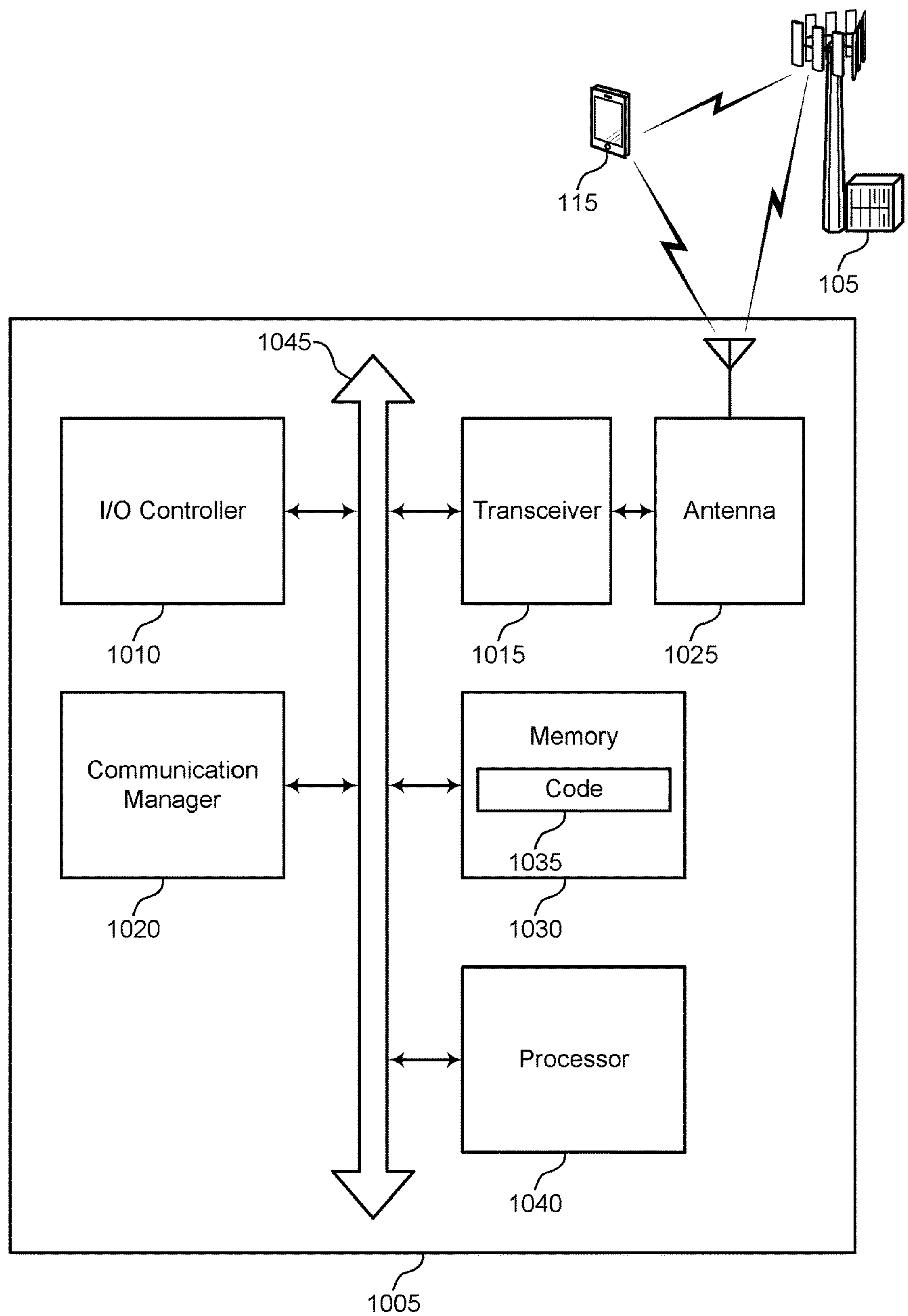
FIG. 10 shows a diagram of a system including a device that supports multicast communication with cross-carrier scheduling in accordance with one or more aspects of the present disclosure.

FIG. 10 shows a diagram of a system including a device 1005 that supports multicast communication with cross-carrier scheduling in accordance with one or more aspects of the present disclosure. The device 1005 may be an example of or include the components of a device 705, a device 805, or a UE 115. The device 1005 may communicate (for example, wirelessly) with one or more network entities 105, one or more UEs 115, or any combination thereof. The device 1005 may include components for bi-directional voice and data communication including components for transmitting and receiving communication, such as a communication manager 1020, an input/output (I/O) controller 1010, a transceiver 1015, an antenna 1025, a memory 1030, code 1035, and a processor 1040. These components may be in electronic communication or otherwise coupled (for example, operatively, communicatively, functionally, electronically, electrically) via one or more buses (for example, a bus 1045).

The I/O controller 1010 may manage input and output signals for the device 1005. The I/O controller 1010 may also manage peripherals not integrated into the device 1005. In some examples, the I/O controller 1010 may represent a physical connection or port to an external peripheral. In some examples, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some examples, the I/O controller 1010 may be implemented as part of a processor, such as the processor 1040. In some examples, a user may interact with the device 1005 via the I/O controller 1010 or via hardware components controlled by the I/O controller 1010.

In some examples, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some examples, the code 1035 may not be directly executable by the processor 1040 but may cause a computer (for example, when compiled and executed) to perform functions described herein. In some examples, the memory 1030 may include, among other things, a basic I/O system (BIOS), which may control basic hardware or software operation such as the interaction with peripheral components or devices.

The processor 1040 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1040 may be configured to operate a memory array using a memory controller. In some other cases, a memory controller may be integrated into the processor 1040. The processor 1040 may be configured to execute computer-readable instructions stored in a memory (for example, the memory 1030) to cause the device 1005 to perform various functions (for example, functions or tasks supporting multicast communication with cross-carrier scheduling). For example, the device 1005 or a component of the device 1005 may include a processor 1040 and memory 1030 coupled with or to the processor 1040, the processor 1040 and memory 1030 configured to perform various functions described herein.

The communication manager 1020 may support wireless communication at the device 1005 (for example, a UE) in accordance with examples as disclosed herein. For example, the communication manager 1020 may be configured as or otherwise support a means for receiving control signaling indicating a cell configuration associated with a first cell of a set of cells, the cell configuration including a scheduling configuration associated with both the first cell and a second cell of the set of cells for multicast communication. The communication manager 1020 may be configured as or otherwise support a means for monitoring for a downlink control channel associated with the multicast communication on one or both of the first cell or the second cell based on the control signaling. The communication manager 1020 may be configured as or otherwise support a means for monitoring for a downlink data channel associated with the multicast communication on one or both of the first cell or the second cell based on the monitoring of the downlink control channel. The communication manager 1020 may be configured as or otherwise support a means for receiving the multicast communication on one or both of the first cell or the second cell based on the monitoring of the downlink data channel.

By including or configuring the communication manager 1020 in accordance with examples as described herein, the device 1005 may support techniques for reduced power consumption.

In some examples, the communication manager 1020 may be configured to perform various operations (for example, receiving, monitoring, transmitting) using or otherwise in cooperation with the transceiver 1015, the one or more antennas 1025, or any combination thereof. Although the communication manager 1020 is illustrated as a separate component, in some examples, one or more functions described with reference to the communication manager 1020 may be supported by or performed by the processor 1040, the memory 1030, the code 1035, or any combination thereof. For example, the code 1035 may include instructions executable by the processor 1040 to cause the device 1005 to perform various aspects of multicast communication with cross-carrier scheduling, or the processor 1040 and the memory 1030 may be otherwise configured to perform or support such operations.

Figure 11:
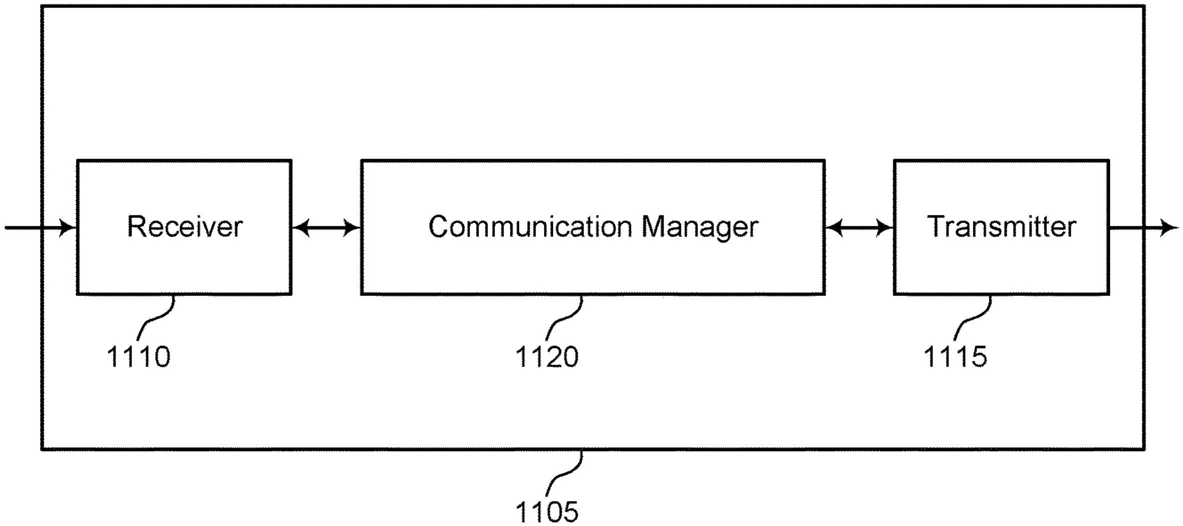
FIGS. 11 and 12 show block diagrams of devices that support multicast communication with cross-carrier scheduling in accordance with one or more aspects of the present disclosure.

FIG. 11 shows a block diagram of a device 1105 that supports multicast communication with cross-carrier scheduling in accordance with one or more aspects of the present disclosure. The device 1105 may be an example of aspects of a network entity 105. The device 1105 may include a receiver 1110, a transmitter 1115, and a communication manager 1120. The communication manager 1120 can be implemented, at least in part, by one or both of a modem and a processor. Each of these components may be in communication with one another (for example, via one or more buses).

The receiver 1110 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (for example, electrical, fiber optic) interfaces, wireless interfaces, or any combination thereof.

The transmitter 1115 may provide a means for outputting (for example, transmitting, providing, conveying, sending) information generated by other components of the device 1105. For example, the transmitter 1115 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (for example, electrical, fiber optic) interfaces, wireless interfaces, or any combination thereof. In some examples, the transmitter 1115 and the receiver 1110 may be co-located in a transceiver, which may include or be coupled with a modem.

The communication manager 1120, the receiver 1110, the transmitter 1115, or various combinations thereof or various components thereof may be examples of means for performing various aspects of multicast communication with cross-carrier scheduling. For example, the communication manager 1120, the receiver 1110, the transmitter 1115, or various combinations or components thereof may support a method for performing one or more of the functions described herein.

In some examples, the communication manager 1120, the receiver 1110, the transmitter 1115, or various combinations or components thereof may be implemented in hardware (for example, in communication management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communication manager 1120, the receiver 1110, the transmitter 1115, or various combinations or components thereof may be implemented in code (for example, as communication management software or firmware) executed by a processor. Such as examples in which implemented in code executed by a processor, the functions of the communication manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communication manager 1120 may be configured to perform various operations (for example, receiving, obtaining, monitoring, outputting, transmitting) using or otherwise in cooperation with the receiver 1110, the transmitter 1115, or both. For example, the communication manager 1120 may receive information from the receiver 1110, send information to the transmitter 1115, or be integrated in combination with the receiver 1110, the transmitter 1115, or both to obtain information, output information, or perform various other operations.

For example, the communication manager 1120 may be configured as or otherwise support a means for transmitting control signaling indicating a cell configuration associated with a first cell of a set of cells, the cell configuration including a scheduling configuration associated with both the first cell and a second cell of the set of cells for multicast communication. The communication manager 1120 may be configured as or otherwise support a means for transmitting a downlink control channel associated with the multicast communication on one or both of the first cell or the second cell based on the control signaling. The communication manager 1120 may be configured as or otherwise support a means for transmitting a downlink data channel associated with the multicast communication on one or both of the first cell or the second cell based on the transmitting of the downlink control channel.

By including or configuring the communication manager 1120 in accordance with examples as described herein, the device 1105 (for example, a processor controlling or otherwise coupled with one or more of the receiver 1110, the transmitter 1115, or the communication manager 1120) may support techniques for reduced power consumption.

Figure 12:
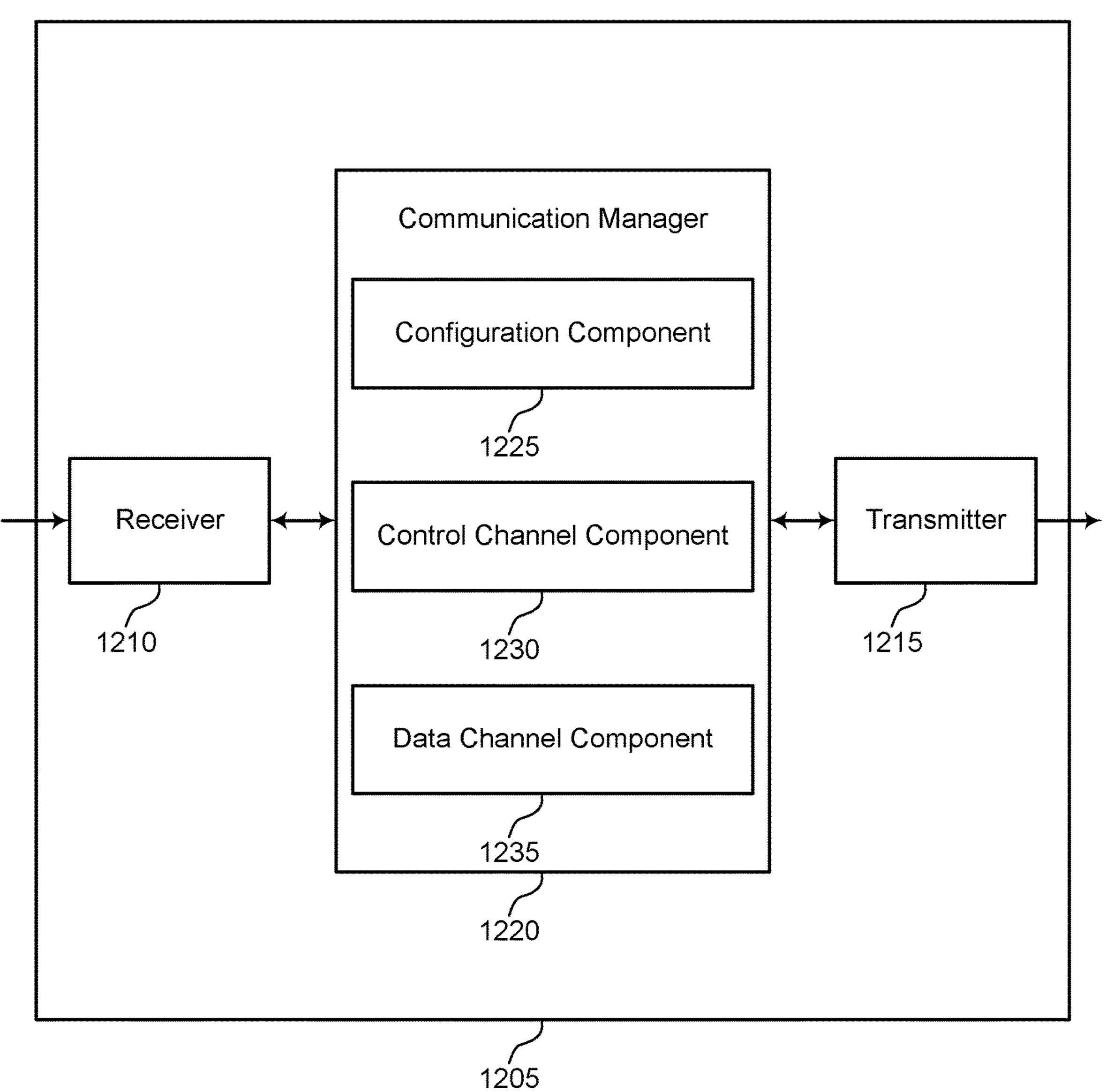

FIG. 12 shows a block diagram of a device 1205 that supports multicast communication with cross-carrier scheduling in accordance with one or more aspects of the present disclosure. The device 1205 may be an example of aspects of a device 1105 or a network entity 105. The device 1205 may include a receiver 1210, a transmitter 1215, and a communication manager 1220. The communication manager 1220 can be implemented, at least in part, by one or both of a modem and a processor. Each of these components may be in communication with one another (for example, via one or more buses).

The receiver 1210 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (for example, electrical, fiber optic) interfaces, wireless interfaces, or any combination thereof.

The transmitter 1215 may provide a means for outputting (for example, transmitting, providing, conveying, sending) information generated by other components of the device 1205. For example, the transmitter 1215 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (for example, electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of multicast communication with cross-carrier scheduling. For example, the communication manager 1220 may include a configuration component 1225, a control channel component 1230, a data channel component 1235, or any combination thereof. In some examples, the communication manager 1220, or various components thereof, may be configured to perform various operations (for example, receiving, obtaining, monitoring, outputting, transmitting) using or otherwise in cooperation with the receiver 1210, the transmitter 1215, or both. For example, the communication manager 1220 may receive information from the receiver 1210, send information to the transmitter 1215, or be integrated in combination with the receiver 1210, the transmitter 1215, or both to obtain information, output information, or perform various other operations.

The configuration component 1225 may be configured as or otherwise support a means for transmitting control signaling indicating a cell configuration associated with a first cell of a set of cells, the cell configuration including a scheduling configuration associated with both the first cell and a second cell of the set of cells for multicast communication. The control channel component 1230 may be configured as or otherwise support a means for transmitting a downlink control channel associated with the multicast communication on one or both of the first cell or the second cell based on the control signaling. The data channel component 1235 may be configured as or otherwise support a means for transmitting a downlink data channel associated with the multicast communication on one or both of the first cell or the second cell based on the transmitting of the downlink control channel.

Figure 13:
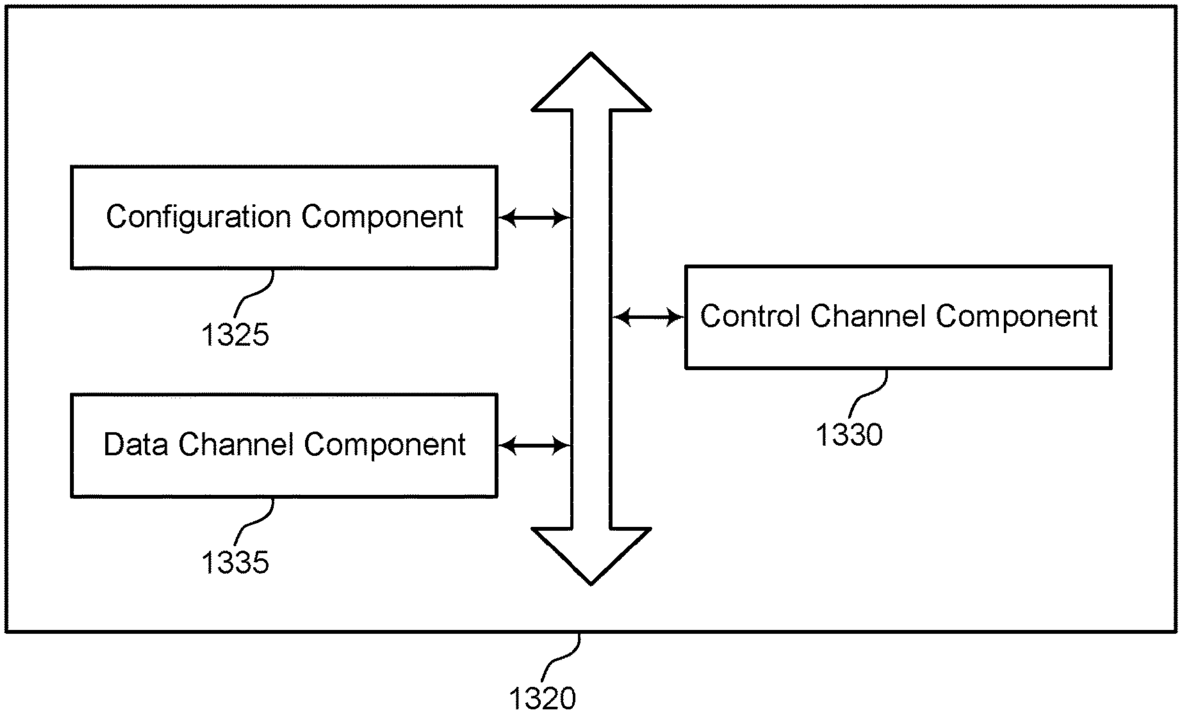
FIG. 13 shows a block diagram of a communication manager that supports multicast communication with cross-carrier scheduling in accordance with one or more aspects of the present disclosure.

FIG. 13 shows a block diagram of a communication manager 1320 that supports multicast communication with cross-carrier scheduling in accordance with one or more aspects of the present disclosure. The communication manager 1320, or various components thereof, may be an example of means for performing various aspects of multicast communication with cross-carrier scheduling. For example, the communication manager 1320 may include a configuration component 1325, a control channel component 1330, a data channel component 1335, or any combination thereof. Each of these components may communicate, directly or indirectly, with one another (for example, via one or more buses), which may include communication within a protocol layer of a protocol stack, communication associated with a logical channel of a protocol stack (for example, between protocol layers of a protocol stack, within a device, component, or virtualized component associated with a network entity 105, between devices, components, or virtualized components associated with a network entity 105), or any combination thereof.

The configuration component 1325 may be configured as or otherwise support a means for transmitting control signaling indicating a cell configuration associated with a first cell of a set of cells, the cell configuration including a scheduling configuration associated with both the first cell and a second cell of the set of cells for multicast communication. The control channel component 1330 may be configured as or otherwise support a means for transmitting a downlink control channel associated with the multicast communication on one or both of the first cell or the second cell based on the control signaling. The data channel component 1335 may be configured as or otherwise support a means for transmitting a downlink data channel associated with the multicast communication on one or both of the first cell or the second cell based on the transmitting of the downlink control channel.

In some examples, to support transmitting the control signaling, the configuration component 1325 may be configured as or otherwise support a means for transmitting an RRC message including an RRC IE indicating the first cell or the second cell for the transmitting of the downlink control channel associated with the multicast communication. In some examples, to support transmitting the downlink control channel, the control channel component 1330 may be configured as or otherwise support a means for transmitting the downlink control channel associated with the multicast communication on the second cell. In some examples, to support transmitting the downlink control channel, the data channel component 1335 may be configured as or otherwise support a means for transmitting the downlink data channel associated with the multicast communication on the first cell. In some examples, the downlink data channel includes a group-common multicast downlink data channel. In some examples, the scheduling configuration corresponds to transmitting scheduling information associated with the multicast communication on the second cell and transmitting the multicast communication on the first cell or on the second cell.

Figure 14:
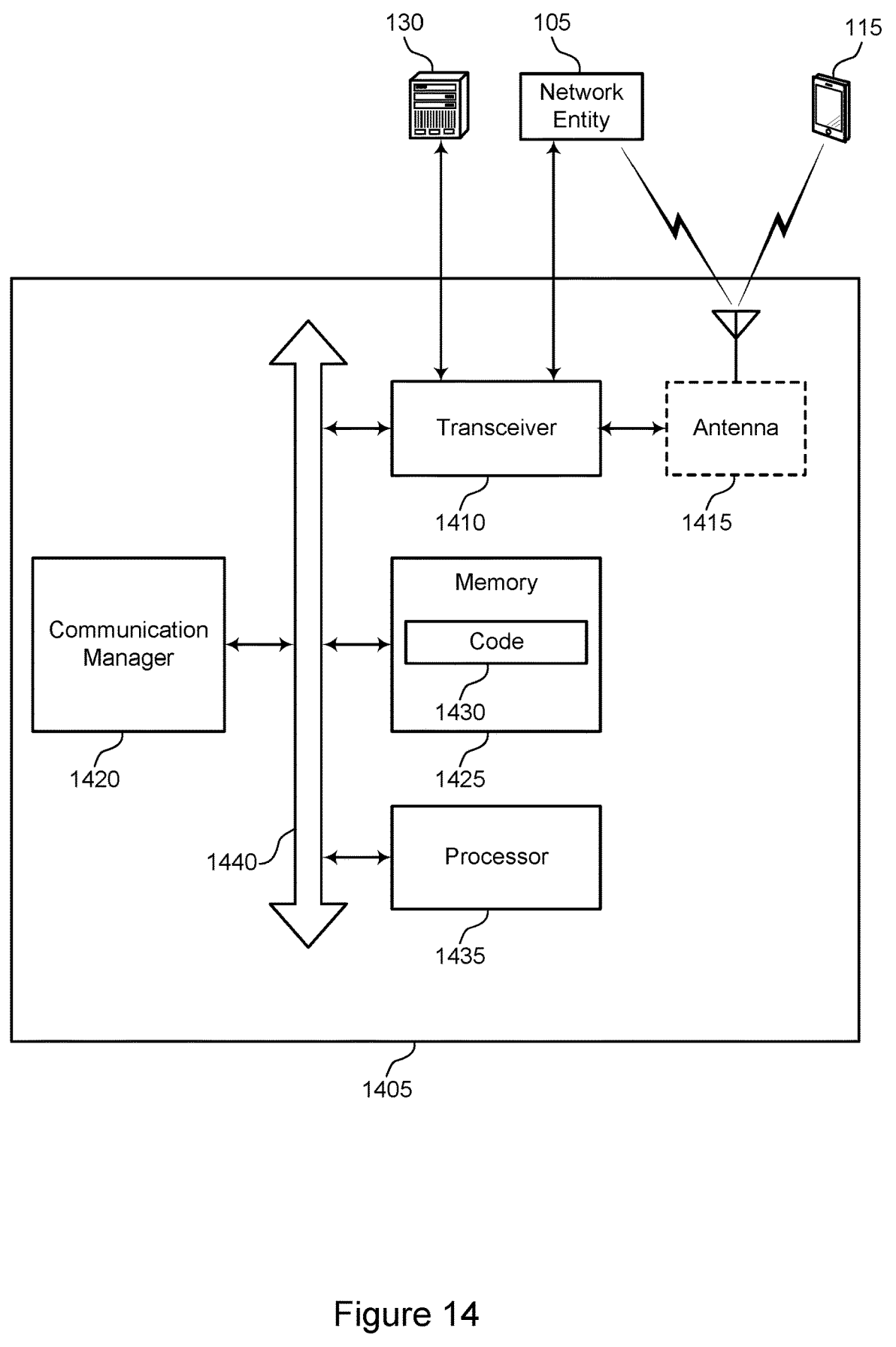

FIG. 14 shows a diagram of a system including a device 1405 that supports multicast communication with cross-carrier scheduling in accordance with one or more aspects of the present disclosure. The device 1405 may be an example of or include the components of a device 1105, a device 1205, or a network entity 105. The device 1405 may communicate with one or more network entities 105, one or more UEs 115, or any combination thereof, which may include communication over one or more wired interfaces, over one or more wireless interfaces, or any combination thereof. The device 1405 may include components that support outputting and obtaining communication, such as a communication manager 1420, a transceiver 1410, an antenna 1415, a memory 1425, code 1430, and a processor 1435. These components may be in electronic communication or otherwise coupled (for example, operatively, communicatively, functionally, electronically, electrically) via one or more buses (for example, a bus 1440).

The transceiver 1410 may support bi-directional communication via wired links, wireless links, or both. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (for example, concurrently). The transceiver 1410 may also include a modem to modulate signals, to provide the modulated signals for transmission (for example, by one or more antennas 1415, by a wired transmitter), to receive modulated signals (for example, from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof. In some examples, the transceiver may be operable to support communication via one or more communication links (for example, a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some examples, the code 1430 may not be directly executable by the processor 1435 but may cause a computer (for example, when compiled and executed) to perform functions described herein. In some examples, the memory 1425 may include, among other things, a BIOS, which may control basic hardware or software operation such as the interaction with peripheral components or devices.

The processor 1435 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some examples, the processor 1435 may be configured to operate a memory array using a memory controller. In some other cases, a memory controller may be integrated into the processor 1435. The processor 1435 may be configured to execute computer-readable instructions stored in a memory (for example, the memory 1425) to cause the device 1405 to perform various functions (for example, functions or tasks supporting multicast communication with cross-carrier scheduling). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (for example, one or more physical nodes and supporting software such as operating systems, virtual machines, or container instances) that may host the functions (for example, by executing code 1430) to perform the functions of the device 1405.

In some examples, a bus 1440 may support communication of (for example, within) a protocol layer of a protocol stack. In some examples, a bus 1440 may support communication associated with a logical channel of a protocol stack (for example, between protocol layers of a protocol stack), which may include communication performed within a component of the device 1405, or between different components of the device 1405 that may be co-located or located in different locations (for example, where the device 1405 may refer to a system, in which one or more of the communication manager 1420, the transceiver 1410, the memory 1425, the code 1430, and the processor 1435 may be located in one of the different components or divided between different components).

In some examples, the communication manager 1420 may manage aspects of communication with a core network 130 (for example, via one or more wired or wireless backhaul links). For example, the communication manager 1420 may manage the transfer of data communication for client devices, such as one or more UEs 115. In some examples, the communication manager 1420 may manage communication with other network entities 105, and may include a controller or scheduler for controlling communication with UEs 115 in cooperation with other network entities 105. In some examples, the communication manager 1420 may support an X2 interface within an LTE/LTE-A wireless communication network technology to provide communication between network entities 105.

For example, the communication manager 1420 may be configured as or otherwise support a means for transmitting control signaling indicating a cell configuration associated with a first cell of a set of cells, the cell configuration including a scheduling configuration associated with both the first cell and a second cell of the set of cells for multicast communication. The communication manager 1420 may be configured as or otherwise support a means for transmitting a downlink control channel associated with the multicast communication on one or both of the first cell or the second cell based on the control signaling. The communication manager 1420 may be configured as or otherwise support a means for transmitting a downlink data channel associated with the multicast communication on one or both of the first cell or the second cell based on the transmitting of the downlink control channel.

By including or configuring the communication manager 1420 in accordance with examples as described herein, the device 1405 may support techniques for reduced power consumption.

In some examples, the communication manager 1420 may be configured to perform various operations (for example, receiving, obtaining, monitoring, outputting, transmitting) using or otherwise in cooperation with the transceiver 1410, the one or more antennas 1415 (for example, where applicable), or any combination thereof. Although the communication manager 1420 is illustrated as a separate component, in some examples, one or more functions described with reference to the communication manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of multicast communication with cross-carrier scheduling, or the processor 1435 and the memory 1425 may be otherwise configured to perform or support such operations.

Figure 15:
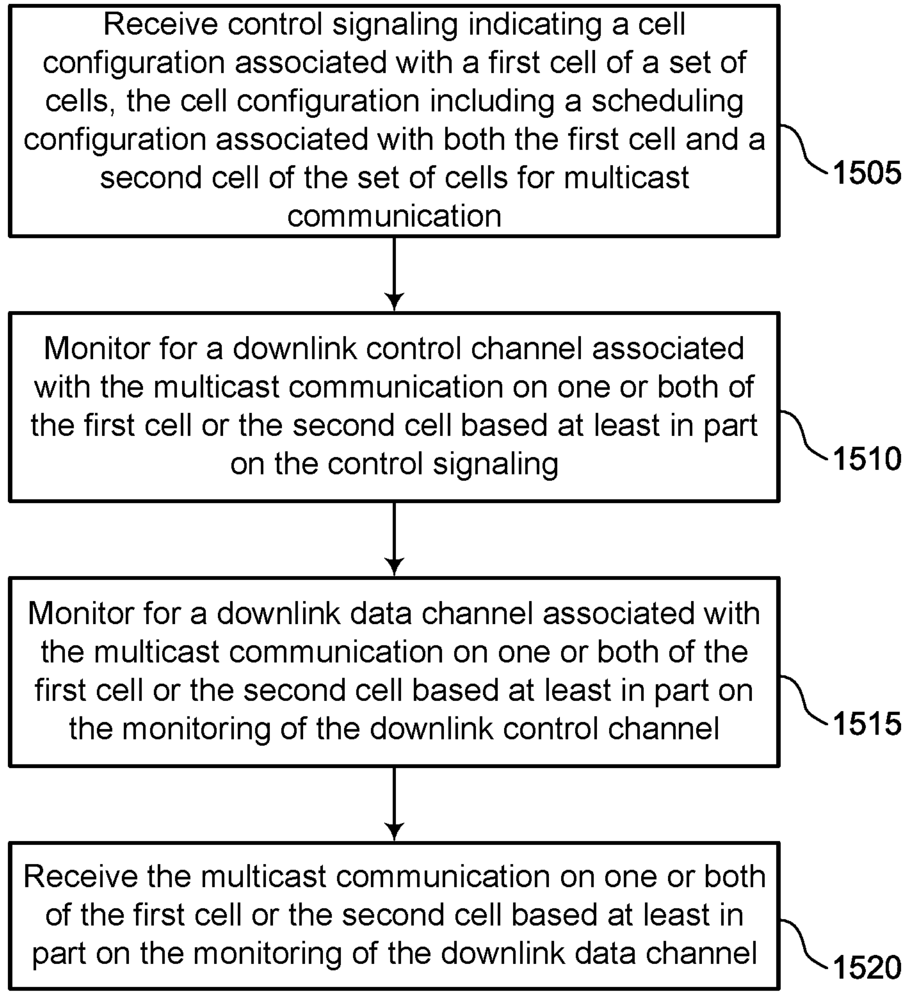
FIGS. 15-18 show flowcharts illustrating methods that support multicast communication with cross-carrier scheduling in accordance with one or more aspects of the present disclosure.

FIG. 15 shows a flowchart illustrating a method 1500 that supports multicast communication with cross-carrier scheduling in accordance with one or more aspects of the present disclosure. The operations of the method 1500 may be implemented by a UE or its components. For example, the operations of the method 1500 may be performed by a UE as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a cell configuration associated with a first cell of a set of cells, the cell configuration including a scheduling configuration associated with both the first cell and a second cell of the set of cells for multicast communication. The operations of 1505 may be performed in accordance with examples as disclosed herein. In some examples, aspects of the operations of 1505 may be performed by a configuration component 925 as described with reference to FIG. 9.

At 1510, the method may include monitoring for a downlink control channel associated with the multicast communication on one or both of the first cell or the second cell based on the control signaling. The operations of 1510 may be performed in accordance with examples as disclosed herein. In some examples, aspects of the operations of 1510 may be performed by a control channel component 930 as described with reference to FIG. 9.

At 1515, the method may include monitoring for a downlink data channel associated with the multicast communication on one or both of the first cell or the second cell based on the monitoring of the downlink control channel. The operations of 1515 may be performed in accordance with examples as disclosed herein. In some examples, aspects of the operations of 1515 may be performed by a data channel component 935 as described with reference to FIG. 9.

At 1520, the method may include receiving the multicast communication on one or both of the first cell or the second cell based on the monitoring of the downlink data channel. The operations of 1520 may be performed in accordance with examples as disclosed herein. In some examples, aspects of the operations of 1520 may be performed by a communication component 940 as described with reference to FIG. 9.

Figure 16:
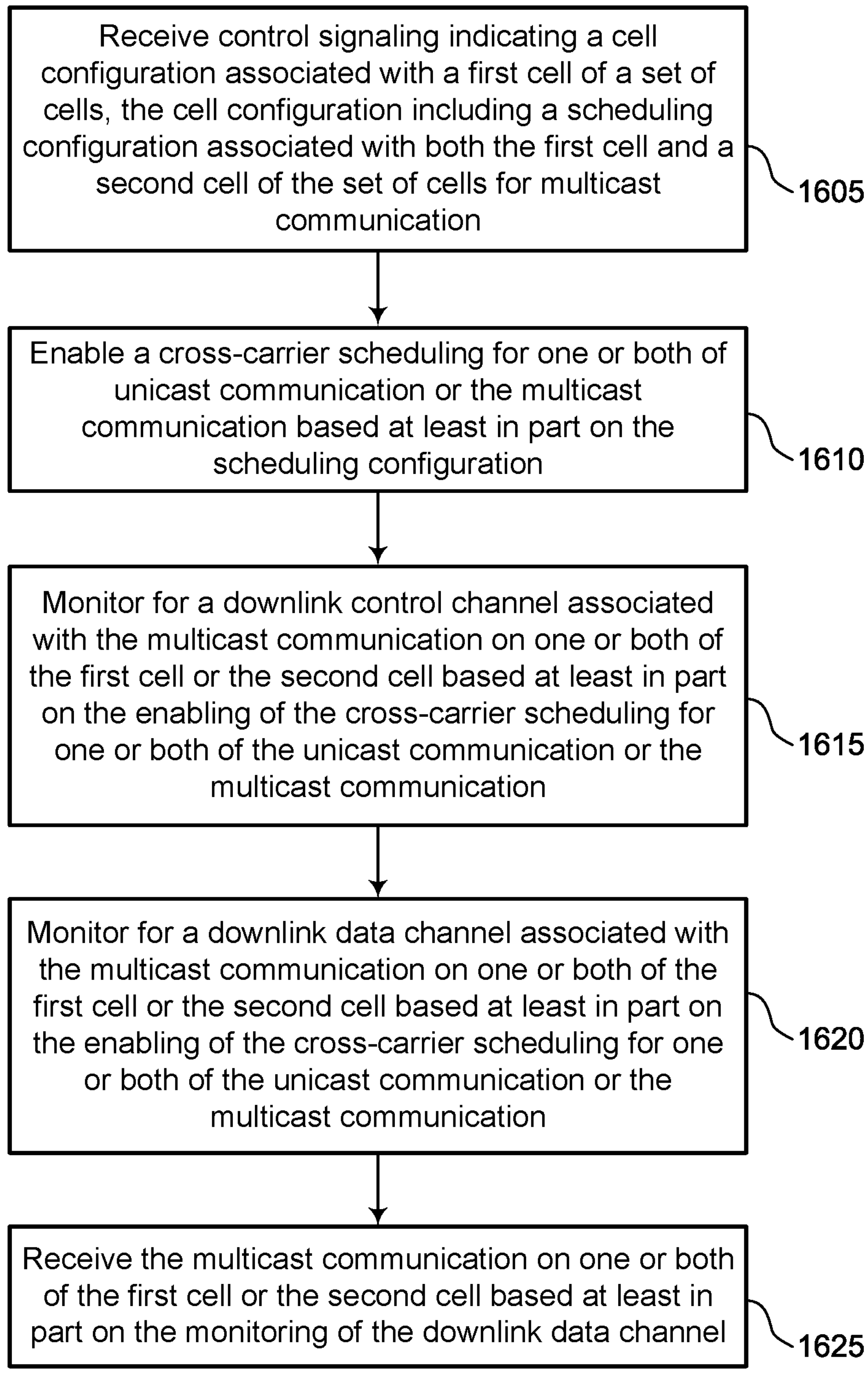

FIG. 16 shows a flowchart illustrating a method 1600 that supports multicast communication with cross-carrier scheduling in accordance with one or more aspects of the present disclosure. The operations of the method 1600 may be implemented by a UE or its components. For example, the operations of the method 1600 may be performed by a UE as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a cell configuration associated with a first cell of a set of cells, the cell configuration including a scheduling configuration associated with both the first cell and a second cell of the set of cells for multicast communication. The operations of 1605 may be performed in accordance with examples as disclosed herein. In some examples, aspects of the operations of 1605 may be performed by a configuration component 925 as described with reference to FIG. 9.

At 1610, the method may include enabling a cross-carrier scheduling for one or both of unicast communication or the multicast communication based on the scheduling configuration. The operations of 1610 may be performed in accordance with examples as disclosed herein. In some examples, aspects of the operations of 1610 may be performed by a scheduler component 945 as described with reference to FIG. 9.

At 1615, the method may include monitoring for a downlink control channel associated with the multicast communication on one or both of the first cell or the second cell based on the enabling of the cross-carrier scheduling for one or both of the unicast communication or the multicast communication. The operations of 1615 may be performed in accordance with examples as disclosed herein. In some examples, aspects of the operations of 1615 may be performed by a control channel component 930 as described with reference to FIG. 9.

At 1620, the method may include monitoring for a downlink data channel associated with the multicast communication on one or both of the first cell or the second cell based on the enabling of the cross-carrier scheduling for one or both of the unicast communication or the multicast communication. The operations of 1620 may be performed in accordance with examples as disclosed herein. In some examples, aspects of the operations of 1620 may be performed by a data channel component 935 as described with reference to FIG. 9.

At 1625, the method may include receiving the multicast communication on one or both of the first cell or the second cell based on the monitoring of the downlink data channel. The operations of 1625 may be performed in accordance with examples as disclosed herein. In some examples, aspects of the operations of 1625 may be performed by a communication component 940 as described with reference to FIG. 9.

Figure 17:
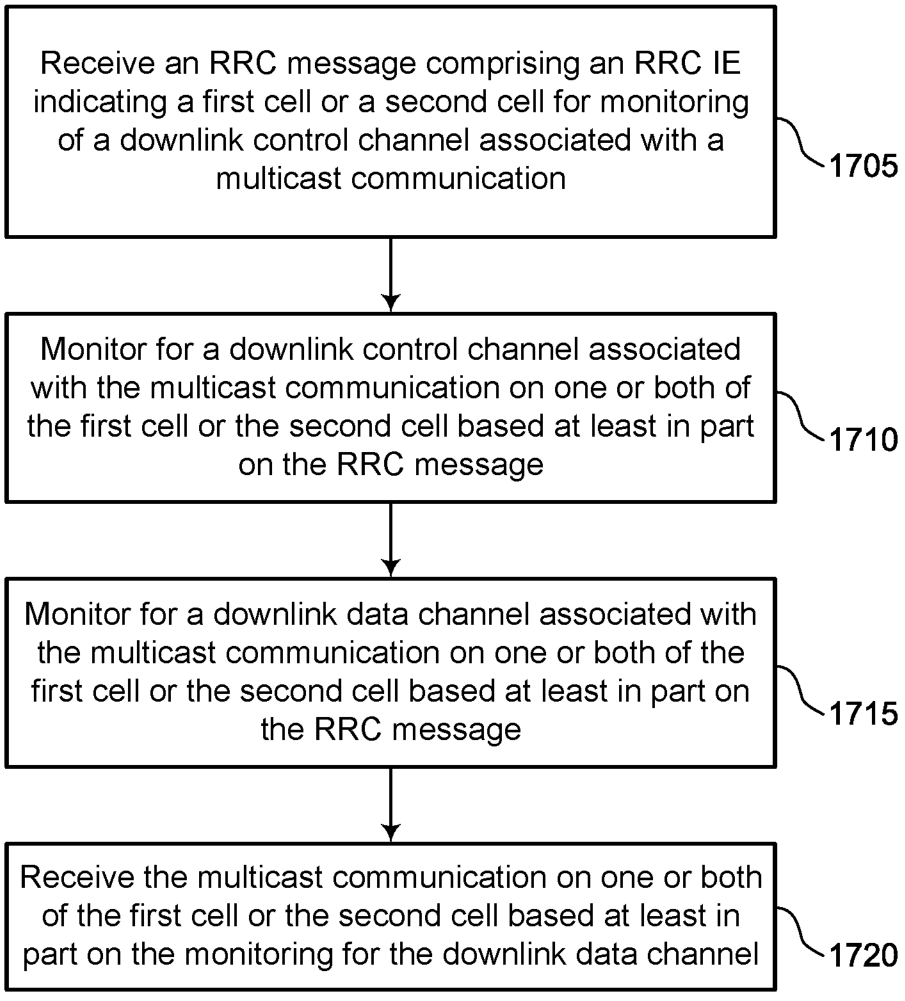

FIG. 17 shows a flowchart illustrating a method 1700 that supports multicast communication with cross-carrier scheduling in accordance with one or more aspects of the present disclosure. The operations of the method 1700 may be implemented by a UE or its components. For example, the operations of the method 1700 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1705, the method may include receiving an RRC message comprising an RRC IE indicating a first cell or a second cell for monitoring of a downlink control channel associated with a multicast communication. The operations of 1705 may be performed in accordance with examples as disclosed herein. In some examples, aspects of the operations of 1705 may be performed by a configuration component 925 as described with reference to FIG. 9.

At 1710, the method may include monitoring for a downlink control channel associated with the multicast communication on one or both of the first cell or the second cell based on the control signaling. The operations of 1710 may be performed in accordance with examples as disclosed herein. In some examples, aspects of the operations of 1710 may be performed by a control channel component 930 as described with reference to FIG. 9.

At 1715, the method may include monitoring for a downlink data channel associated with the multicast communication on one or both of the first cell or the second cell based on the RRC message. The operations of 1715 may be performed in accordance with examples as disclosed herein. In some examples, aspects of the operations of 1715 may be performed by a data channel component 935 as described with reference to FIG. 9.

At 1720, the method may include receiving the multicast communication on one or both of the first cell or the second cell based on the monitoring for the downlink data channel. The operations of 1720 may be performed in accordance with examples as disclosed herein. In some examples, aspects of the operations of 1720 may be performed by a communication component 940 as described with reference to FIG. 9.

Figure 18:
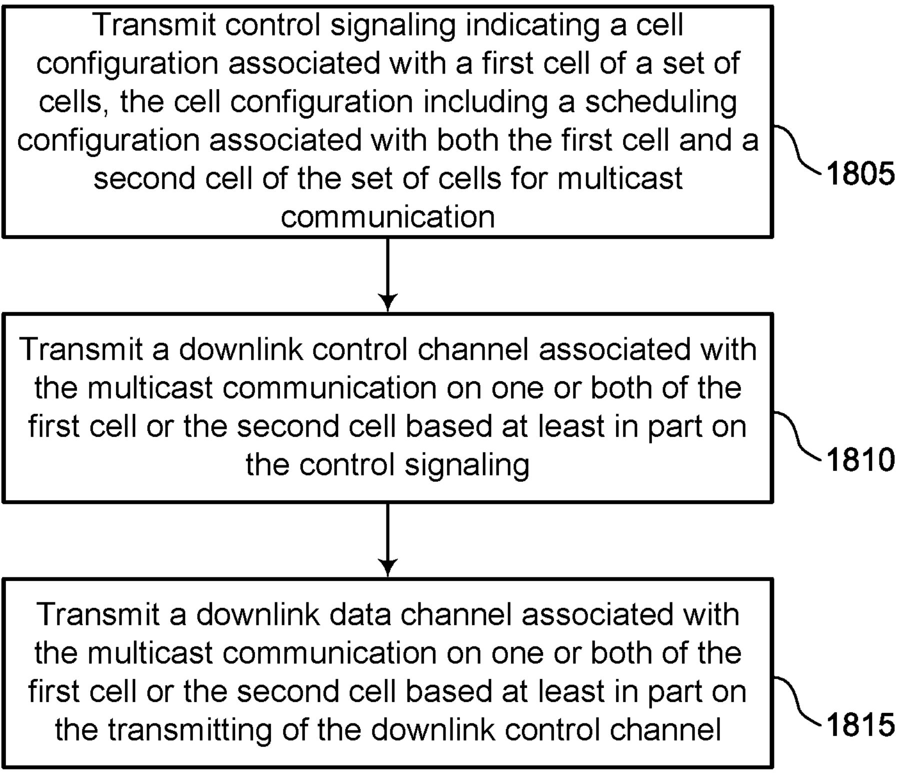

FIG. 18 shows a flowchart illustrating a method 1800 that supports multicast communication with cross-carrier scheduling in accordance with one or more aspects of the present disclosure. The operations of the method 1800 may be implemented by a network entity or its components. For example, the operations of the method 1800 may be performed by a network entity as described with reference to FIGS. 1-6 and 11-14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting control signaling indicating a cell configuration associated with a first cell of a set of cells, the cell configuration including a scheduling configuration associated with both the first cell and a second cell of the set of cells for multicast communication. The operations of 1805 may be performed in accordance with examples as disclosed herein. In some examples, aspects of the operations of 1805 may be performed by a configuration component 1325 as described with reference to FIG. 13.

At 1810, the method may include transmitting a downlink control channel associated with the multicast communication on one or both of the first cell or the second cell based on the control signaling. The operations of 1810 may be performed in accordance with examples as disclosed herein. In some examples, aspects of the operations of 1810 may be performed by a control channel component 1330 as described with reference to FIG. 13.

At 1815, the method may include transmitting a downlink data channel associated with the multicast communication on one or both of the first cell or the second cell based on the transmitting of the downlink control channel. The operations of 1815 may be performed in accordance with examples as disclosed herein. In some examples, aspects of the operations of 1815 may be performed by a data channel component 1335 as described with reference to FIG. 13.

The following provides an overview of aspects of the present disclosure:

Aspect 1: A method for wireless communication at a UE, comprising: receiving control signaling indicating a cell configuration associated with a first cell of a set of cells, the cell configuration including a scheduling configuration associated with both the first cell and a second cell of the set of cells for multicast communication; monitoring for a downlink control channel associated with the multicast communication on one or both of the first cell or the second cell based at least in part on the control signaling; monitoring for a downlink data channel associated with the multicast communication on one or both of the first cell or the second cell based at least in part on the monitoring of the downlink control channel; and receiving the multicast communication on one or both of the first cell or the second cell based at least in part on the monitoring of the downlink data channel.

Aspect 2: The method of aspect 1, further comprising: enabling a cross-carrier scheduling for one or both of unicast communication or the multicast communication based at least in part on the scheduling configuration, wherein one or both of the monitoring of the downlink control channel or the monitoring of the downlink data channel is based at least in part on the enabling of the cross-carrier scheduling for one or both of the unicast communication or the multicast communication.

Aspect 3: The method of any of aspects 1 through 2, wherein the receiving of the control signaling comprises: receiving an RRC message comprising an RRC IE indicating the first cell or the second cell for the monitoring of the downlink control channel associated with the multicast communication, wherein the monitoring of the downlink control channel is based at least in part on the receiving of the RRC message comprising the RRC IE indicating the first cell or the second cell.

Aspect 4: The method of any of aspects 1 through 3, further comprising: receiving the downlink control channel associated with the multicast communication on the second cell based at least in part on the monitoring of the downlink control channel on the second cell, and wherein the receiving of the multicast communication comprises: receiving the downlink data channel associated with the multicast communication on the first cell based at least in part on the receiving of the downlink control channel on the second cell.

Aspect 5: The method of aspect 4, wherein the downlink data channel comprises a group-common multicast downlink data channel.

Aspect 6: The method of any of aspects 4 through 5, further comprising: receiving a downlink control channel configuration of the second cell associated with the monitoring of the downlink control channel, wherein a respective CFR associated with the monitoring of the downlink control channel is configured on the second cell, and the respective CFR associated with the monitoring of the downlink data channel is configured on the first cell, and wherein the monitoring of the downlink control channel on the second cell is based at least in part on the respective CFR associated with the monitoring of the downlink control channel configured on the second cell.

Aspect 7: The method of any of aspects 4 through 6, further comprising: receiving a downlink control channel configuration of the first cell associated with one or both of the monitoring of the downlink control channel or the monitoring of the downlink data channel, wherein a respective CFR associated with the monitoring of the downlink control channel is configured on the first cell, and the respective CFR associated with the monitoring of the downlink data channel is configured on the first cell, and wherein the monitoring of the downlink control channel on the second cell is based at least in part on the respective CFR associated with the monitoring of the downlink control channel configured on the first cell.

Aspect 8: The method of any of aspects 4 through 7, further comprising: receiving a respective downlink control channel configuration of each of the first cell and the second cell associated with the monitoring of the downlink control channel, wherein a respective CFR associated with the monitoring of the downlink control channel on the second cell is configured on the first cell and the second cell, and wherein the monitoring of the downlink control channel on the second cell is based at least in part on the receiving of the respective downlink control channel configuration of each of the first cell and the second cell.

Aspect 9: The method of aspect 8, wherein the respective downlink control channel configuration of each of the first cell and the second cell comprises at least a first downlink control channel configuration of the first cell indicating a control resource set configuration and at least a second downlink control channel configuration of the second cell indicating a search space set configuration.

Aspect 10: The method of any of aspects 1 through 9, further comprising: receiving scheduling information for the multicast communication associated with the downlink data channel based at least in part on the monitoring of the downlink control channel associated with the multicast communication, wherein receiving the multicast communication is based at least in part on the receiving of the scheduling information for the multicast communication.

Aspect 11: The method of any of aspects 1 through 10, wherein the scheduling configuration comprises a cross-carrier scheduling configuration, the method further comprising: receiving a downlink control channel configuration of the first cell associated with the monitoring of the downlink control channel, the downlink control channel configuration being configured on the first cell, wherein the monitoring of the downlink control channel on the first cell is based at least in part on the receiving of the downlink control channel configuration of the first cell.

Aspect 12: The method of aspect 11, wherein receiving the multicast communication comprises: receiving the multicast communication on the first cell based at least in part on the monitoring of the downlink data channel on the first cell.

Aspect 13: The method of any of aspects 11 through 12, further comprising: receiving unicast communication on the first cell based at least in part on the monitoring of the downlink control channel on the second cell.

Aspect 14: The method of any of aspects 1 through 13, further comprising: determining a number of time and frequency resources associated with the monitoring of the downlink control channel on one or both of the first cell or the second cell, and wherein the monitoring of the downlink control channel on one or both of the first cell or the second cell is based at least in part on the determining of the number of time and frequency resources associated with the monitoring of the downlink control channel on one or both of the first cell or the second cell.

Aspect 15: The method of aspect 14, further comprising: determining a SCS associated with the monitoring of the downlink control channel on one or both of the first cell or the second cell over a TTI, wherein the determining of the number of time and frequency resources associated with the monitoring of the downlink control channel on one or both of the first cell or the second cell is based at least in part on the determining of the SCS.

Aspect 16: The method of any of aspects 14 through 15, wherein the number of time and frequency resources is based at least in part on a sum of a first number of CCEs associated with the monitoring of the downlink control channel on the first cell and a second number of CCEs associated with the monitoring of the downlink control channel on the second cell.

Aspect 17: The method of aspect 16, wherein the control signaling comprises an indication of a ratio for allocating a respective number of time and frequency resources of the sum to cross-carrier scheduling associated with the first cell and the second cell.

Aspect 18: The method of any of aspects 1 through 17, further comprising: determining a number of blind decodes, a number of blind decoding candidates, or a number of PDCCH candidates, or any combination thereof, associated with the monitoring of the downlink control channel on one or both of the first cell or the second cell, wherein the monitoring of the downlink control channel on one or both of the first cell or the second cell is based at least in part on the determining of blind decodes, the number of blind decoding candidates, or the number of PDCCH candidates, or any combination thereof Aspect 19: The method of any of aspects 1 through 18, further comprising: one or both of monitoring a respective downlink control channel associated with unicast communication on the first cell or monitoring the downlink control channel associated with the multicast communication on the second cell based at least in part on the control signaling, the method further comprising: receiving one or both of the unicast communication or the multicast communication on the first cell based at least in part on one or both of the monitoring of the respective downlink control channel associated with the unicast communication on the first cell or the monitoring of the downlink control channel associated with the multicast communication on the second cell.

Aspect 20: The method of any of aspects 1 through 19, further comprising: refraining from monitoring the downlink control channel on the first cell or the second cell based at least in part on the received control signaling, wherein the monitoring of the downlink control channel is based at least in part on the refraining from the monitoring of the downlink control channel on the first cell or the second cell.

Aspect 21: The method of any of aspects 1 through 20, wherein the scheduling configuration comprises scheduling information associated with the multicast communication on the second cell and receiving the multicast communication on the first cell or on the second cell.

Aspect 22: The method of any of aspects 1 through 21, further comprising: determining a separate cross-carrier scheduling configuration for unicast communication and the multicast communication based at least in part on an indication in the cell configuration indicating cross-carrier scheduling for the unicast communication or the multicast communication associated with the first cell or the second cell, wherein one or both of the monitoring of the downlink control channel or the monitoring of the downlink data channel is based at least in part on the separate cross-carrier scheduling configuration for the unicast communication and the multicast communication.

Aspect 23: A method of wireless communication at a network entity, comprising: transmitting control signaling indicating a cell configuration associated with a first cell of a set of cells, the cell configuration including a scheduling configuration associated with both the first cell and a second cell of the set of cells for multicast communication; transmitting a downlink control channel associated with the multicast communication on one or both of the first cell or the second cell based at least in part on the control signaling; and transmitting a downlink data channel associated with the multicast communication on one or both of the first cell or the second cell based at least in part on the transmitting of the downlink control channel.

Aspect 24: The method of aspect 23, wherein transmitting the control signaling comprises: transmitting an RRC message comprising an RRC IE indicating the first cell or the second cell for the transmitting of the downlink control channel associated with the multicast communication.

Aspect 25: The method of any of aspects 23 through 24, wherein transmitting the downlink control channel comprises: transmitting the downlink control channel associated with the multicast communication on the second cell, wherein transmitting the downlink data channel comprises: transmitting the downlink data channel associated with the multicast communication on the first cell.

Aspect 26: The method of aspect 25, wherein the downlink data channel comprises a group-common multicast downlink data channel.

Aspect 27: The method of any of aspects 25 through 26, wherein the scheduling configuration corresponds to transmitting scheduling information associated with the multicast communication on the second cell and transmitting the multicast communication on the first cell or on the second cell.

Aspect 28: An apparatus for wireless communication at a UE, comprising a processor; memory coupled with the processor; and instructions stored in the memory and executable by the processor to cause the apparatus to perform a method of any of aspects 1 through 22.

Aspect 29: An apparatus for wireless communication at a UE, comprising at least one means for performing a method of any of aspects 1 through 22.

Aspect 30: A non-transitory computer-readable medium storing code for wireless communication at a UE, the code comprising instructions executable by a processor to perform a method of any of aspects 1 through 22.

Aspect 31: An apparatus comprising a processor; memory coupled with the processor; and instructions stored in the memory and executable by the processor to cause the apparatus to perform a method of any of aspects 23 through 27.

Aspect 32: An apparatus comprising at least one means for performing a method of any of aspects 23 through 27.

Aspect 33: A non-transitory computer-readable medium storing code the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Such as examples in which implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, such as examples in which the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and "determining" can include calculating, computing, processing, deriving, investigating, looking up (such as via looking up in a table, a database or another data structure), ascertaining. Also, "determining" can include receiving (such as receiving information), accessing (such as accessing data in a memory). Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. Such as examples in which just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A user equipment (UE), comprising:

at least one processor; and at least one memory coupled with the at least one processor and storing instructions executable by the at least one processor to cause the UE to:

receive control signaling indicating a cell configuration associated with a first cell of a set of cells, the cell configuration including a scheduling configuration associated with both the first cell and a second cell of the set of cells for multicast communication, the control signaling including a radio resource control message comprising a radio resource control information element indicating the first cell or the second cell for monitoring of a downlink control channel associated with the multicast communication;

monitor for the downlink control channel associated with the multicast communication on the first cell or the second cell in accordance with the radio resource control information element indication;

monitor for a downlink data channel associated with the multicast communication on the first cell or the second cell in accordance with the monitoring of the downlink control channel; and receive the multicast communication the first cell or the second cell in accordance with the monitoring of the downlink data channel.

2. The UE of claim 1, further comprising enabling a cross-carrier scheduling for one or both of unicast communication or the multicast communication based at least in part on the scheduling configuration, wherein one or both of the monitoring of the downlink control channel or the monitoring of the downlink data channel is based at least in part on the enabling of the cross-carrier scheduling for one or both of the unicast communication or the multicast communication.

3. The UE of claim 1, wherein the processor is further configured to cause the apparatus to:

schedule information for the multicast communication associated with the downlink data channel based at least in part on the monitoring of the downlink control channel associated with the multicast communication, wherein receiving the multicast communication is based at least in part on the receiving of the scheduling information for the multicast communication.

4. The UE of claim 1, wherein the scheduling configuration comprises a cross-carrier scheduling configuration, and wherein the processor is further configured to cause the apparatus to:

receive a downlink control channel configuration of the first cell associated with the monitoring of the downlink control channel, the downlink control channel configuration being configured on the first cell, wherein the monitoring of the downlink control channel on the first cell is based at least in part on the receiving of the downlink control channel configuration of the first cell.

5. The UE of claim 4, wherein receiving the multicast communication comprises receiving the multicast communication on the first cell based at least in part on the monitoring of the downlink data channel on the first cell.

6. The UE of claim 4, wherein the processor is further configured to cause the apparatus to receive a unicast communication on the first cell based at least in part on the monitoring of the downlink control channel on the second cell.

7. The UE of claim 1, wherein the processor is further configured to cause the apparatus to determine a a number of time and frequency resources associated with the monitoring of the downlink control channel on one or both of the first cell or the second cell, and wherein the monitoring of the downlink control channel on one or both of the first cell or the second cell is based at least in part on the determining of the number of time and frequency resources associated with the monitoring of the downlink control channel on one or both of the first cell or the second cell.

8. The UE of claim 7, wherein the processor is further configured to cause the apparatus to determine a a subcarrier spacing associated with the monitoring of the downlink control channel on one or both of the first cell or the second cell over a transmission time interval, wherein the determining of the number of time and frequency resources associated with the monitoring of the downlink control channel on one or both of the first cell or the second cell is based at least in part on the determining of the subcarrier spacing.

9. The UE of claim 7, wherein the number of time and frequency resources is based at least in part on a sum of a first number of control channel elements associated with the monitoring of the downlink control channel on the first cell and a second number of control channel elements associated with the monitoring of the downlink control channel on the second cell.

10. The UE of claim 9, wherein the control signaling comprises an indication of a ratio for allocating a respective number of time and frequency resources of the sum to cross-carrier scheduling associated with the first cell and the second cell.

11. The UE of claim 1, wherein the processor is further configured to cause the apparatus to determine a a number of blind decodes, a number of blind decoding candidates, or a number of physical downlink control channel candidates, or any combination thereof, associated with the monitoring of the downlink control channel on one or both of the first cell or the second cell, wherein the monitoring of the downlink control channel on one or both of the first cell or the second cell is based at least in part on the determining of blind decodes, the number of blind decoding candidates, or the number of physical downlink control channel candidates, or any combination thereof.

12. The UE of claim 1, wherein the processor is further configured to cause the apparatus to one or both of monitoring a respective downlink control channel associated with unicast communication on the first cell or monitoring the downlink control channel associated with the multicast communication on the second cell based at least in part on the control signaling, wherein the processor is further configured to cause the apparatus to:

receive one or both of the unicast communication or the multicast communication on the first cell based at least in part on one or both of the monitoring of the respective downlink control channel associated with the unicast communication on the first cell or the monitoring of the downlink control channel associated with the multicast communication on the second cell.

13. The UE of claim 1, wherein the processor is further configured to cause the apparatus to refrain from monitoring the downlink control channel on the first cell or the second cell based at least in part on the received control signaling, wherein the monitoring of the downlink control channel is based at least in part on the refraining from the monitoring of the downlink control channel on the first cell or the second cell.

14. The UE of claim 1, wherein the scheduling configuration comprises scheduling information associated with the multicast communication on the second cell and receiving the multicast communication on the first cell or on the second cell.

15. The UE of claim 1, wherein the processor is further configured to cause the apparatus to determine a separate cross-carrier scheduling configuration for unicast communication and the multicast communication based at least in part on an indication in the cell configuration indicating cross-carrier scheduling for the unicast communication or the multicast communication associated with the first cell or the second cell, wherein one or both of the monitoring of the downlink control channel or the monitoring of the downlink data channel is based at least in part on the separate cross-carrier scheduling configuration for the unicast communication and the multicast communication.

16. A user equipment (UE), comprising:

at least one processor; and at least one memory coupled with the at least one processor and storing instructions executable by the at least one processor to cause the UE to:

receive control signaling indicating a cell configuration associated with a first cell of a set of cells, the cell configuration including a scheduling configuration associated with both the first cell and a second cell of the set of cells for multicast communication;

receiving a downlink control channel configuration of the second cell associated with monitoring of a downlink control channel, wherein a first common frequency resource (CFR) associated with the monitoring of the downlink control channel is configured on the second cell, and a second CFR associated with monitoring of a downlink data channel is configured on the first cell;

monitor for the downlink control channel on the second cell in accordance with the first CFR;

receive the downlink control channel on the second cell in accordance with the monitoring of the downlink control channel on the second cell;

monitor for the downlink data channel on the first cell in accordance with the second CFR;

receive the downlink data channel including the multicast communication on the first cell in accordance with the monitoring of the downlink data channel on the first cell.

17. A user equipment (UE), comprising:

at least one processor; and at least one memory coupled with the at least one processor and storing instructions executable by the at least one processor to cause the UE to:

receive control signaling indicating a cell configuration associated with a first cell of a set of cells, the cell configuration including a scheduling configuration associated with both the first cell and a second cell of the set of cells for multicast communication;

receive a downlink control channel configuration of the first cell associated with one or both of monitoring of a downlink control channel or monitoring of the downlink data channel, wherein a first common frequency resource (CFR) associated with the monitoring of the downlink control channel is configured on the first cell, and a second CFR associated with monitoring of a downlink data channel is configured on the first cell;

monitor for the downlink control channel on the second cell in accordance with the first CFR;

receive the downlink control channel on the second cell in accordance with the monitoring of the downlink control channel on the second cell;

monitor for the downlink data channel on the first cell in accordance with the second CFR;

receive the downlink data channel including the multicast communication on the first cell in accordance with the monitoring of the downlink data channel on the first cell.

18. A user equipment (UE), comprising:

at least one processor; and at least one memory coupled with the at least one processor and storing instructions executable by the at least one processor to cause the UE to:

receive control signaling indicating a cell configuration associated with a first cell of a set of cells, the cell configuration including a scheduling configuration associated with both the first cell and a second cell of the set of cells for multicast communication;

receive a respective downlink control channel configuration of each of the first cell and the second cell associated with monitoring of a downlink control channel, wherein a first common frequency resource (CFR) associated with the monitoring of the downlink control channel on the second cell is configured on the first cell and the second cell;

monitor for the downlink control channel on the second cell in accordance with the first CFR;

receive the downlink control channel on the second cell in accordance with the monitoring of the downlink control channel on the second cell;

monitor for a downlink data channel associated with the multicast communication on the first cell in accordance with the downlink control channel;

receive the downlink data channel including the multicast communication on the first cell in accordance with the monitoring of the downlink data channel on the first cell.

19. The UE of claim 18, wherein the first downlink control channel configuration of each of the first cell and the second cell comprises at least a first downlink control channel configuration of the first cell indicating a control resource set configuration and at least a second downlink control channel configuration of the second cell indicating a search space set configuration.

20. A network entity, comprising:

at least one processor; and at least one memory coupled with the at least one processor and storing instructions executable by the at least one processor to cause the network entity to:

transmit control signaling indicating a cell configuration associated with a first cell of a set of cells, the cell configuration including a scheduling configuration associated with both the first cell and a second cell of the set of cells for multicast communication, the control signaling including a radio resource control message comprising a radio resource control information element indicating the first cell or the second cell for monitoring of a downlink control channel associated with the multicast communication;

transmit the downlink control channel associated with the multicast communication on the first cell or the second cell in accordance with the radio resource control information element indication; and transmit a downlink data channel associated with the multicast communication on the first cell or the second cell in accordance with the transmitting of the downlink control channel.

21. The network entity of claim 20, wherein transmitting the downlink control channel comprises:

transmitting the downlink control channel associated with the multicast communication on the second cell, wherein transmitting the downlink data channel comprises:

transmitting the downlink data channel associated with the multicast communication on the first cell.

22. The network entity of claim 21, wherein the downlink data channel comprises a group-common multicast downlink data channel.

23. The network entity of claim 21, wherein the scheduling configuration corresponds to transmitting scheduling information associated with the multicast communication on the second cell and transmitting the multicast communication on the first cell or on the second cell.

* * * * *